(12) United States Patent
Tietz et al.

(10) Patent No.: US 9,763,174 B2
(45) Date of Patent: Sep. 12, 2017

(54) COMMUNICATION SYSTEM

(71) Applicant: NEC Corporation, Minato-ku, Tokyo (JP)

(72) Inventors: Robert Tietz, Horsham (GB); Kenji Kawaguchi, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/412,760

(22) PCT Filed: Jun. 27, 2013

(86) PCT No.: PCT/JP2013/068311
§ 371 (c)(1),
(2) Date: Jan. 5, 2015

(87) PCT Pub. No.: WO2014/007308
PCT Pub. Date: Jan. 9, 2014

(65) Prior Publication Data
US 2015/0156708 A1    Jun. 4, 2015

(30) Foreign Application Priority Data

Jul. 5, 2012 (GB) .................................. 1211998.8

(51) Int. Cl.
*H04W 48/16* (2009.01)
*H04W 4/02* (2009.01)
(Continued)

(52) U.S. Cl.
CPC .............. *H04W 48/16* (2013.01); *H04W 4/02* (2013.01); *H04W 4/20* (2013.01); *H04W 64/00* (2013.01);
(Continued)

(58) Field of Classification Search
CPC ........ H04L 67/18; H04W 4/20; H04W 48/16; H04W 64/00; H04W 80/085; H04W 4/02; H04W 84/005
See application file for complete search history.

(56) References Cited

U.S. PATENT DOCUMENTS

2010/0311419 A1* 12/2010 Bi ......................... H04W 60/00
455/435.1
2011/0250906 A1* 10/2011 Siomina .................. H04W 4/02
455/456.2

(Continued)

FOREIGN PATENT DOCUMENTS

CN   101883427 A   11/2010
CN   102457959 A   5/2012
(Continued)

OTHER PUBLICATIONS

3rd Generation Partnership Project, "3GPP TS 36.305", V1 0.3.0, Sep.

(Continued)

*Primary Examiner* — Kenneth Lam

(57) ABSTRACT

A communication node provides information relating to a location of a user device in a communication system. The communication node associates with a relay node for providing the user device with access to the communication system via a cell operated by the relay node. The communication node obtains an indication of whether or not the cell is configured as a mobile cell and provides, when the cell is configured as a mobile cell, information indicating that the cell is configured as a mobile cell to a further communication node.

22 Claims, 24 Drawing Sheets

(51) Int. Cl.
    *H04W 4/20* (2009.01)
    *H04W 80/08* (2009.01)
    *H04W 64/00* (2009.01)
    *H04W 84/00* (2009.01)
    *H04L 29/08* (2006.01)

(52) U.S. Cl.
    CPC ........... *H04W 80/085* (2013.01); *H04L 67/18* (2013.01); *H04W 84/005* (2013.01)

(56) References Cited

U.S. PATENT DOCUMENTS

| | | | | |
|---|---|---|---|---|
| 2011/0275364 | A1* | 11/2011 | Austin | H04L 41/12 455/423 |
| 2012/0015654 | A1* | 1/2012 | Palanki | H04W 64/003 455/435.1 |
| 2012/0015666 | A1* | 1/2012 | Horn | H04L 45/021 455/456.1 |
| 2012/0149392 | A1* | 6/2012 | Siomina | H04W 64/00 455/456.1 |
| 2012/0184302 | A1* | 7/2012 | Kazmi | H04W 64/00 455/456.5 |
| 2012/0208523 | A1* | 8/2012 | Hans | H04W 64/00 455/422.1 |
| 2012/0213105 | A1* | 8/2012 | Wigren | G01S 5/06 370/252 |
| 2012/0282932 | A1* | 11/2012 | Yu | H04W 84/005 455/437 |
| 2012/0329476 | A1* | 12/2012 | Tenny | H04W 64/00 455/456.1 |
| 2013/0039342 | A1* | 2/2013 | Kazmi | H04W 48/16 370/331 |
| 2013/0084884 | A1* | 4/2013 | Teyeb | H04W 48/04 455/456.1 |
| 2013/0329629 | A1* | 12/2013 | Bao | H04W 36/0083 370/315 |
| 2014/0120948 | A1* | 5/2014 | Jin | H04W 64/003 455/456.1 |
| 2014/0192781 | A1* | 7/2014 | Teyeb | H04W 36/34 370/331 |
| 2014/0228057 | A1* | 8/2014 | Uga | H04W 64/00 455/456.3 |
| 2015/0063199 | A1* | 3/2015 | Wang | H04W 8/06 370/315 |

FOREIGN PATENT DOCUMENTS

| | | |
|---|---|---|
| CN | 102469579 A | 5/2012 |
| EP | 2173130 A1 | 4/2010 |
| EP | 2387279 A1 | 11/2011 |
| JP | 2003-132124 A | 5/2003 |
| WO | 2012/044246 A1 | 4/2012 |

OTHER PUBLICATIONS

3rd Generation Partnership Project, "3GPP TS 22.071", V10.0.0, Mar. 2011.
3rd Generation Partnership Project, "3GPP TS 36.300", V10.8.0, Jun. 2012.
3rd Generation Partnership Project, "3GPP TS 36.355", V10.5.0, Jun. 2012.
3rd Generation Partnership Project, "3GPP TS 36.455", V1 0.3.0, Jun. 2012.
3rd Generation Partnership Project, "3GPP TS 36.413", V1 0.6.0, Jun. 2012.
International Search Report for PCT Application No. PCT/JP2013/068311, mailed on Mar. 13, 2014.
Japanese Office Action for JP Application No. 2014-560149 mailed on Feb. 3, 2016 with English Translation.

* cited by examiner

COMMUNICATION SYSTEM

This application is a National Stage Entry of PCT/JP2013/068311 filed on Jun. 27, 2013, which claims priority from United Kingdom Patent Application 1211998.8 filed on Jul. 5, 2012, the contents of all of which are incorporated herein by reference, in their entirety.

TECHNICAL FIELD

The present invention relates to a communication system and to components thereof for providing communication services to mobile or fixed communication devices. The invention has particular but not exclusive relevance to providing location services in cells operated by mobile relays in Long Term Evolution (LTE) Advanced systems as currently defined in associated $3^{rd}$ Generation Partnership Project (3GPP) standards documentation.

BACKGROUND ART

Relaying is considered for LTE Advanced as a tool to improve, for example, the coverage of high data rates for User Equipment (UE), temporary network deployment, cell edge throughput and/or to provide coverage in new cell areas. LTE Advanced supports relaying by having a Relay Node (RN) wirelessly connected to a base station (eNB) (referred to as a Donor eNB (DeNB)). In addition to serving its own 'donor' cell, the Donor eNB serves the RN, via a modified version of the Evolved Universal Terrestrial Radio Access (E-UTRA) radio interface. The modified interface is referred to as the 'Un' interface.

Each RN is provided with many aspects of a base station's functionality and is therefore capable of acting as a base station serving its own 'relay' cell. From the perspective of the user equipment (such as mobile telephones) in the relay cell, therefore, the RN essentially appears to be a conventional LTE base station. In addition to the base station functionality, however, the RN also supports a subset of the UE functionality including, for example, many aspects of the physical layer, Medium Access Control (MAC), radio resource control (RRC), and non access stratum (NAS) functionality, to allow it to connect wirelessly to a Donor eNB. From the perspective of the Donor eNB, therefore, the RN essentially appears to be an item of user equipment such as a mobile (cellular) telephone.

In communication systems, Location Services (LCS) may be provided to allow determination of location related information (such as a geographic position and/or velocity) for mobile telephones (or other user equipment) based, for example, on radio signal measurements. Specifically, an LCS Client entity requests the location related information for one or more target mobile telephones from an LCS Server. The LCS Client (which may be a software application) is provided within the communication system (e.g. within a mobile telephone), or externally to the communication system. The LCS Server entity employs an appropriate positioning method in order to obtain location information of the target mobile telephone(s) as requested by the LCS Client.

In LTE, both control plane and user plane positioning procedures are supported. User plane positioning is supported using a 'Secure User Plane Location' (SUPL) protocol between the mobile telephone for which the location related information has been requested and a so called 'SUPL Location Platform' (SLP) which is responsible for positioning co-ordination and calculations over the user plane. The SLP connects to the mobile telephone via a user plane data connection. Control plane positioning is supported using a so called 'Enhanced Serving Mobile Location Centre' (E-SMLC) which is a positioning server node that manages overall co-ordination and calculations required for obtaining location related information for a target mobile telephone (e.g. position and/or velocity of the mobile telephone). The E-SMLC exchanges data with the mobile telephone to be positioned, and the base station serving this mobile telephone, using control plane signalling.

There are three positioning methods supported for E-UTRAN. The first is called 'Enhanced Cell ID' (E-CID) based positioning method, which estimates the position of a target mobile telephone using knowledge about the geographical coordinates of the base station serving the mobile telephone (and/or the coordinates of the cell in which the mobile telephone is camped where these are different). The second method is called a Downlink Positioning using Observed Time Difference Of Arrival (OTDOA) method, which estimates the position of a target mobile telephone using measurements made by the mobile telephone of the UTRAN frame timing and knowledge about the geographical coordinates of the base station and/or cell serving this mobile telephone. The third positioning method is called an Assisted Global Navigation Satellite System (A-GNSS) based positioning method, which may be used by user equipment equipped with GNSS capability. Examples of GNSS include Global Positioning System (GPS) and Galileo. Providing network assistance on top of the GNSS, e.g. Assisted GPS (A-GPS), can reduce position calculation time from minutes to seconds.

LTE also supports hybrid positioning techniques using combinations of the above positioning methods.

LTE uses the LPP ('LTE Positioning Protocol') location protocol between a positioning server (E-SMLC/SLP) and a target mobile telephone. This is either carried in NAS signalling or as user data. In any case, LPP is transparent to the base station serving the target mobile telephone.

LTE also uses the LPPa (LTE Positioning Protocol Annex) between the E-SMLC and the base stations. LPPa messages are carried as Protocol Data Units (PDUs) within S1 signalling messages.

In order to obtain the location of a mobile telephone, the positioning function of the LCS Server requires knowledge of the geographical coordinates of the cell (i.e. the base station or relay node) serving this mobile telephone.

However, in some situations, the RN will be installed in a moving vehicle, such as on a train, bus, ship, aeroplane, or the like. Such a mobile relay node (MRN) and its cell will hence change its geographical location as the vehicle is moving and it will also change its attachment from one Donor eNB to another. In this case, even though this change of attachment occurs between a RN and the DeNBs, the mobile telephones remain served by the same, albeit 'mobile' cell of the same RN. In this case, however, the LCS Server is unable to provide full location services for the mobile telephones served by the MRN.

In particular, the LCS Server cannot use cell-specific geographic positioning methods for mobile telephones served by mobile relay nodes. Furthermore, this deficiency cannot always be alleviated by satellite based positioning (e.g. the A-GNSS positioning method) because such techniques cannot be relied upon for situations in which mobile telephones are served by a fast moving mobile relay node and in which the clear and uninterrupted reception from positioning satellites required for such techniques cannot be guaranteed.

SUMMARY OF THE INVENTION

The present invention aims to provide an improved communication system and improved components of the communication system which overcome or at least alleviate one or more of the above issues.

According to one aspect there is provided a communication node for providing information relating to a location of a user device in a communication system, the communication node comprising: means for associating with a relay node for providing said user device with access to the communication system via a cell operated by the relay node; means for obtaining an indication of whether or not said cell is configured as a mobile cell; and means for providing, when said cell is configured as a mobile cell, information indicating that said cell is configured as a mobile cell to a further communication node.

In another aspect there is provided a relay node for providing information relating to a location of a user device in a communication system wherein said relay node is operable as a mobile relay node and wherein the relay node comprises: means for associating with a base station; means for operating at least one cell for providing the user equipment access to the communication system; means for providing information indicating that said at least one cell is configured as a mobile cell when said relay node is operating as a mobile relay node.

The means for providing may provide information identifying said relay node and/or information identifying said cell. The information identifying said relay node may comprise an identifier for identifying the relay node as a target communication device (e.g. an 'MRN UE ID') and the information identifying said cell may comprise a cell identifier, for example an E-UTRAN Cell Global Identifier 'ECGI'.

The information indicating that said cell is configured as a mobile cell may be provided responsive to the communication node receiving a request for locating said user device. The means for providing may also provide information identifying the user device (e.g. 'UE ID').

The information indicating that said cell is configured as a mobile cell may be provided in response to the communication node associating with the relay node. Updated information indicating that said cell no longer associated with said communication node may be provided in response to the communication node de-associating with the relay node.

The communication node and/or the relay node may comprise means for obtaining location related data for the relay node and/or the user device. When the relay node is a mobile relay node, the means for obtaining location related data may provide, to said further communication node, information related to a current location of the relay node for use by said further communication node in a determination of a current position of said relay node and/or the cell the relay node operates, whereby to determine a position of said user device based on said current position of the relay node and/or the cell.

The information indicating that said cell is configured as a mobile cell may be provided using at least one message, comprising at least one of an LTE (Long Term Evolution) Positioning Protocol 'LPP' message, an LTE Positioning Protocol Annex 'LPPa' message, and a Radio Resource Control 'RRC' protocol message.

The at least one message may comprise at least one of an 'E-CID Measurement Initiation Response', an 'OTDOA Information Response', a 'Provide Capabilities' message, a 'Mobile Cell Information' message, a 'Mobile Cell Information Response', an 'E-CID Measurement Initiation Failure', an 'OTDOA Information Failure', and a 'Mobile Cell Position' message. The information indicating that said cell is configured as a mobile cell may comprise a 'Mobile Cell Indication' information element.

The communication node may compare said information identifying said cell with information identifying a list of mobile cells whereby to determine whether or not said cell is configured as a mobile cell.

The communication node may obtain said indication of whether or not said cell is configured as a mobile cell either directly or indirectly from said relay node.

The communication node and/or the relay node may comprise a location service client for requesting location related information for a target communication device.

The information indicating that said cell is configured as a mobile cell may be provided in response to a change in the configuration of said cell to become configured as a mobile cell.

The communication node may be configured as a base station. The information indicating that said cell is configured as a mobile cell may be provided via another network entity (for example a mobility management entity 'MME'). The communication node may be configured as a mobility management entity 'MME', in which case the indication of whether or not said cell is configured as a mobile cell may be obtained from a base station.

The further communication node may comprise a location services server (e.g. an Enhanced Serving Mobile Location Centre 'E-SMLC' and/or a Secure User Plane Location (SUPL) Location Platform 'SLP').

In yet another aspect there is provided a communication node for providing information relating to a location of a target user device, wherein said target user device is served by a relay node, the communication node comprising: means for receiving a request for positioning said target user device from a client in a further communication node; means for identifying a cell in which said target user device is located; means for initiating a positioning procedure for obtaining information relating to a location said target user device responsive to receiving said request; means for determining, as part of said positioning procedure, whether or not said identified cell is configured as a mobile cell; and means for responding, as part of said positioning procedure, to said request for positioning the target user device, in dependence on whether or not said identified cell is configured as a mobile cell.

The communication node may comprise means for obtaining a geographical location of the user device and/or the mobile cell. The communication node may also comprise means for obtaining information identifying said cell. The information identifying said cell may comprise a cell identifier, for example an E-UTRAN Cell Global Identifier 'ECGI'.

The determining means may determine whether or not said identified cell is configured as a mobile cell based on information obtained when the relay node associates with a base station and/or mobility management entity ('MME') of the communication system.

The determining means may determine whether or not said identified cell is configured as a mobile cell based on information received in response to a request sent by the communication node to the relay node or to a base station and/or mobility management entity ('MME') associated with the relay node.

The responding means may respond to the request for positioning the target user device by sending, to the client, a failure indication when the identified cell is determined to be configured as a mobile cell. The responding means may respond to the request for positioning said target user device by determining a current location of the relay node and/or cell when the identified cell is determined to be configured as a mobile cell. The responding means may respond to the request for positioning the target user device by sending, to the client, the current location of the relay node and/or cell when the identified cell is determined to be configured as a mobile cell.

The responding means may respond to the request for positioning the target user device by determining a location of the target user device based on the current location of the relay node and/or cell and a position of the target user device relative to the current location of the relay node and/or cell, when the identified cell is determined to be configured as a mobile cell.

The position of said target user device may be determined relative to the current location of the relay node based on information received from the relay node and/or a base station with which the relay node is associated. The responding means may respond to the request for positioning the target user device by determining a location of the target user device based on a satellite positioning scheme when the identified cell is determined to be configured as a mobile cell.

The responding means may also respond to the request for positioning the target user device by sending, to the client, the determined location of the target user device. The communication node may comprise a client for generating a request for positioning said relay node, whereby to obtain a location of the relay node.

The communication node may comprise means for obtaining an identifier for the relay node (e.g. an 'MRN UE ID') for use in identifying the relay node to be a target communication device in the request for positioning the relay node.

The determining means may compare the information identifying the cell with information identifying a list of mobile cells whereby to determine whether or not the cell is configured as a mobile cell.

The determining means may obtain the information indicating that the cell is configured as a mobile cell from at least one received message. The at least one received message may comprise at least one of an LTE (Long Term Evolution) Positioning Protocol 'LPP' message, an LTE Positioning Protocol Annex 'LPPa' message, and a Radio Resource Control 'RRC' protocol message. The at least one received message may comprise at least one of an 'E-CID Measurement Initiation Response', an 'OTDOA Information Response', a 'Provide Capabilities' message, a 'Mobile Cell Information' message, a 'Mobile Cell Information Response', an 'E-CID Measurement Initiation Failure', an 'OTDOA Information Failure', and a 'Mobile Cell Position' message.

The communication node may receive a 'Mobile Cell Indication' information element from a further communication node.

In a further aspect there is provided a user device for requesting information relating to a location of a target communication device in a communication system, the communication device comprising: means for generating a request for positioning the target user device; and means for communicating with a communication node in pursuance of said generated request, said communicating means being operable to: send the generated request to the communication node; and receive, from said communication node, a response to said request wherein said response takes account of whether or not a cell in which said communication device is located is configured as a mobile cell.

In one aspect, there is also provided a method performed by a communication node for providing information relating to a location of a user device in a communication system, the method comprising: associating with a relay node for providing said user device with access to the communication system via a cell operated by the relay node; obtaining an indication of whether or not said cell is configured as a mobile cell; and when said cell is configured as a mobile cell, providing information, to another communication node, indicating that said cell is configured as a mobile cell.

In another aspect, there is provided a method performed by a relay node for providing information relating to a location of a user device in a communication system wherein said relay node is operable as a mobile relay node, the method comprising: associating with a base station; and providing information indicating that at least one cell operated by the relay node is configured as a mobile cell when said relay node is operating as a mobile relay node. In yet another aspect, there is provided a method performed by a communication node for providing information relating to a location of a target user device, wherein said target user device is served by a relay node of a communication system, the method comprising: receiving, from a client in a further communication node, a request for positioning the target user device; identifying a cell in which said target user device is located; initiating a positioning procedure for obtaining information relating to a location said target user device responsive to receiving said step of request said request; determining, as part of said positioning procedure, whether or not said identified cell is configured as a mobile cell; and responding, as part of said positioning procedure, to said request for positioning the target user device, in dependence on whether or not said identified cell is configured as a mobile cell.

In a further aspect, there is provided a method performed by a user device for requesting information relating to a location of a target user device, the method comprising: generating a request for positioning the target user device; sending the generated request to a communication node; and receiving, from said communication node, a response to said request wherein said response takes account of whether or not a cell in which said communication device is located is configured as a mobile cell.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE DRAWINGS

Embodiments of the invention will now be described, by way of example only, with reference to the attached figures in which.

DETAILED DESCRIPTION OF EXEMPLARY EMBODIMENTS

Overview

Figure 1:
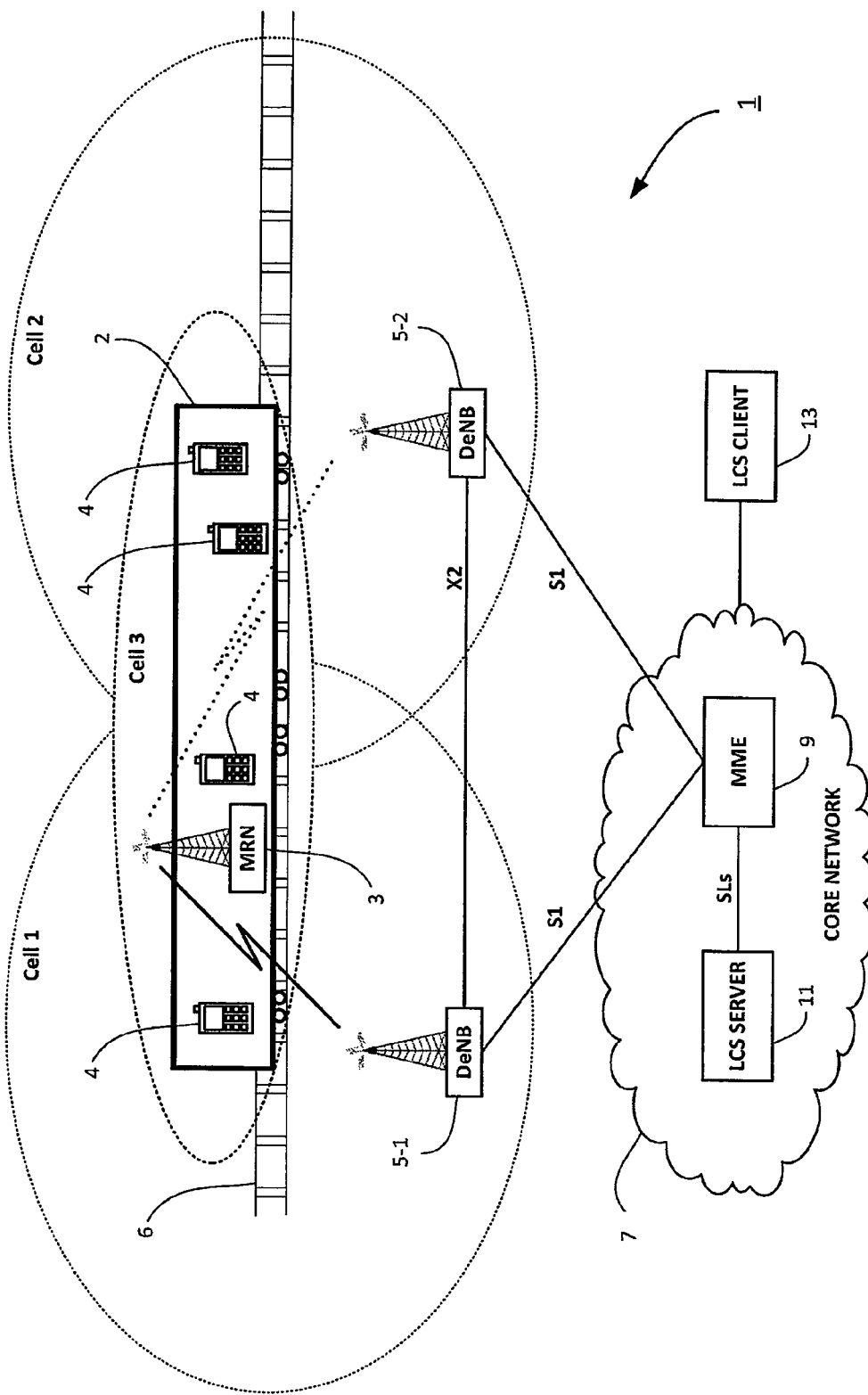
FIG. 1 schematically illustrates a mobile telecommunication system having a relay node mounted in a train.

FIG. 1 schematically illustrates a mobile (cellular) telecommunication system 1 that includes a train 2 having a mobile relay node 3 that provides base station functionality for a plurality of items of user equipment 4 (UEs—e.g. mobile telephones carried by passengers) in the train 2. The relay node 3 attaches to donor base stations 5-1 to 5-2 as the train 2 travels along a track 6. The telecommunications system 1 also includes a core network 7 that comprises: a Mobility Management Entity (MME) 9 that manages the mobility of mobile telephones 4 within the core network 7; an Operations and Maintenance unit (OAM) (not shown) which configures the various devices in the network; and a Location Services Server (LCS) 11 which acquires geographical location of mobile telephone 4 upon a request from an LCS Client 13. In LTE, the LCS Server 11 may comprise, for example, a Secure User Plane Location (SUPL) Platform/Enhanced Serving Mobile Location Centre (SLP/E-SMLC) node, which is connected to the MME 9 via a so called 'SLs' interface. In this system, the donor base stations 5 are coupled to each other via an 'X2' interface and to the MME 9 via an 'S1' interface.

As the train 2 travels along the track 6, the geographical location of the relay node 3 changes—potentially rapidly. In this embodiment, however, the LCS Server 11 is beneficially made aware of which cells are mobile (e.g. in this case: Cell 3) and obtains the current location of a relay node 3 operating these cells so that services requiring a geographic location of mobile telephones 4 within these cells can still be provided.

Therefore, in this embodiment, when the LCS Server 11 receives, from the LCS Client 13, a positioning request for location related information for a target mobile telephone 4, the LCS Server 11 generates and sends a request for location information from which the requested location related information can be derived towards the base station serving this mobile telephone 4. Depending on the type of positioning required, the request generated and sent by the LCS Server 11 is either an 'E-CID Measurement Initiation Request' or an 'OTDOA Information Request' formulated according to the LTE Positioning Protocol Annex (LPPa) protocol.

However, since the base station first receiving this request is operating as a donor base station 5 (e.g. DeNB 5-1 and 5-2), and the target mobile telephone 4 is served by an MRN 3, the DeNB 5 forwards this message to the MRN 3 transparently. The MRN 3 returns an indication, to the LCS Server 11, that the target mobile telephone 4 is served by a mobile cell. The indication is provided is sent to the LCS Server 11 in a dedicated Information Element (IE) within a response to the LCS Server's request for location information. In this embodiment, the Information Element is included in a response message in the form of an 'E-CID Measurement Initiation Response' message in response to a request for location information comprising an E-CID Measurement Initiation Request or in the form of an 'OTDOA Information Response' message in response to a request for location information comprising an 'OTDOA Information Request'.

In this embodiment, a unique identification of the MRN 3 (e.g. an 'MRN UE ID') and a unique identification of the cell(s) under the control of the MRN 3 are also provided in the response. The unique identification of the cell may be, for example, an E-UTRAN Cell Global Identifier (ECGI), or a list of ECGIs for cells controlled by the MRN 3 if there is more than one cell. The response message also contains an identification of the target mobile telephone 4 associated with this MRN 3.

The LCS Server 11 receives the response message and obtains a geographical location for the MRN 3, for example by performing an LCS procedure to locate the MRN 3, as if it were a normal item of user equipment operating in the cell of the DeNB 5 serving the MRN 3. Once the geographical location for the MRN 3 has been obtained, the LCS Server 11 can also determine a geographical location for a target mobile telephone 4 served by the MRN 3.

The LCS Server 11 can therefore return the obtained geographical position information of the target mobile telephone 4 to the LCS Client 13 that originally requested the information.

Therefore, the LCS Server 11 is advantageously able to obtain a current geographical location of the MRN that is serving the target mobile telephone 4 and thus is able to determine the geographical location of the mobile telephone 4. This way, more reliable positioning services are provided and the LCS Server 11 avoids obtaining an erroneous or significantly outdated geographical position for the target mobile telephone 3. Moreover, the procedure is transparent for the target mobile telephone 4 and the LCS Client 13 thereby ensuring compatibility with legacy mobile telephones and LCS Clients.

Further details of the LTE positioning architecture will be described below with reference to FIGS. 5 to 7. Example signalling diagrams illustrating various embodiments will be described with reference to FIGS. 8 to 10.

Mobile Relay Node

Figure 2:
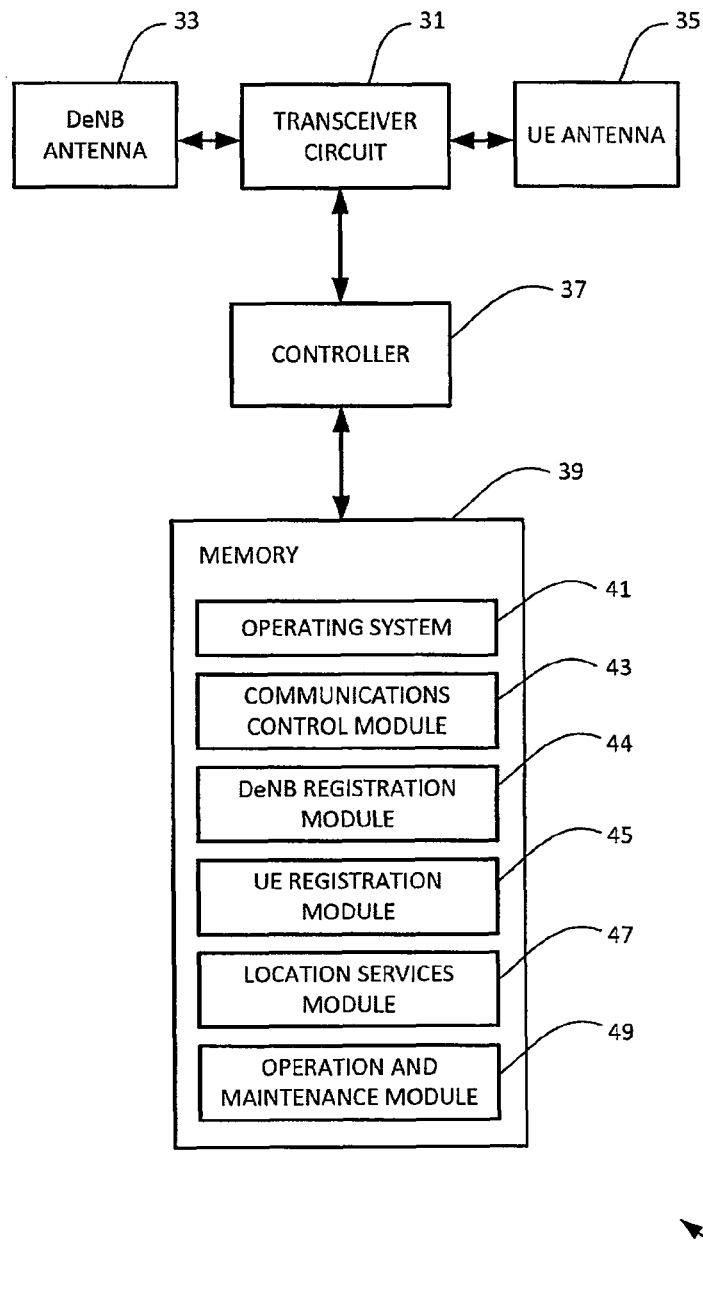
FIG. 2 is a block diagram illustrating the main components of the mobile relay node forming part of the system shown in FIG. 1.

FIG. 2 is a block diagram illustrating the main components of the relay node 3 shown in FIG. 1. The relay node 3 is a communications node like the base station, providing services within its own coverage area, but the relay node 3 does not connect directly to the core network 7. Instead, it connects wirelessly to a donor base station 5, which is then operable to provide a connection to the core network 7.

As shown, the relay node 3 includes a transceiver circuit 31 which is operable to transmit signals to, and to receive signals from, the (donor) base station 5 via base station antenna 33 and the user equipment 4 via the UE antenna 35. The operation of the transceiver circuit 31 is controlled by a controller 37 in accordance with software stored in memory 39. The software includes, among other things, an operating system 41, a communications control module 43, a donor base station registration module 44, a user equipment registration module 45; a location services module 47; and an operation and maintenance module 49.

The communications control module 43 is operable to control communication with the user equipment 4 and the (donor) base station 5 including, for example, allocation of resources to be used by the transceiver circuit 31 in its communications with each of the user equipment 4 and with the base station 5.

The donor base station registration module 44 is operable to perform registration of the relay node 3 with a donor base station 5, for example, during start up or handover of the relay node 3. The user equipment registration module 45 is operable to keep track of user equipment 4 served by the cell(s) of the relay node.

The location services module 47 is operable to provide information to the LCS Server 11 (via donor base station 5) necessary to obtain geographical location of user equipment. The location services module 47 is operable, for example, to indicate to the LCS Server 11 (via the donor base station 5) that it is operating mobile cells and to provide a list of cell identifiers identifying these mobile cells.

The operation and maintenance module 49 is operable to interface with an OAM entity in the core network 7 for setting up and storing operating parameters of the relay node 3. The operating parameters stored by the operation and maintenance module 49 include, for example, a list of relay node cells and their unique identifiers (e.g. ECGIs) and configuration data for the relay node cells including mobile cells and supported positioning methods.

Base Station

Figure 3:
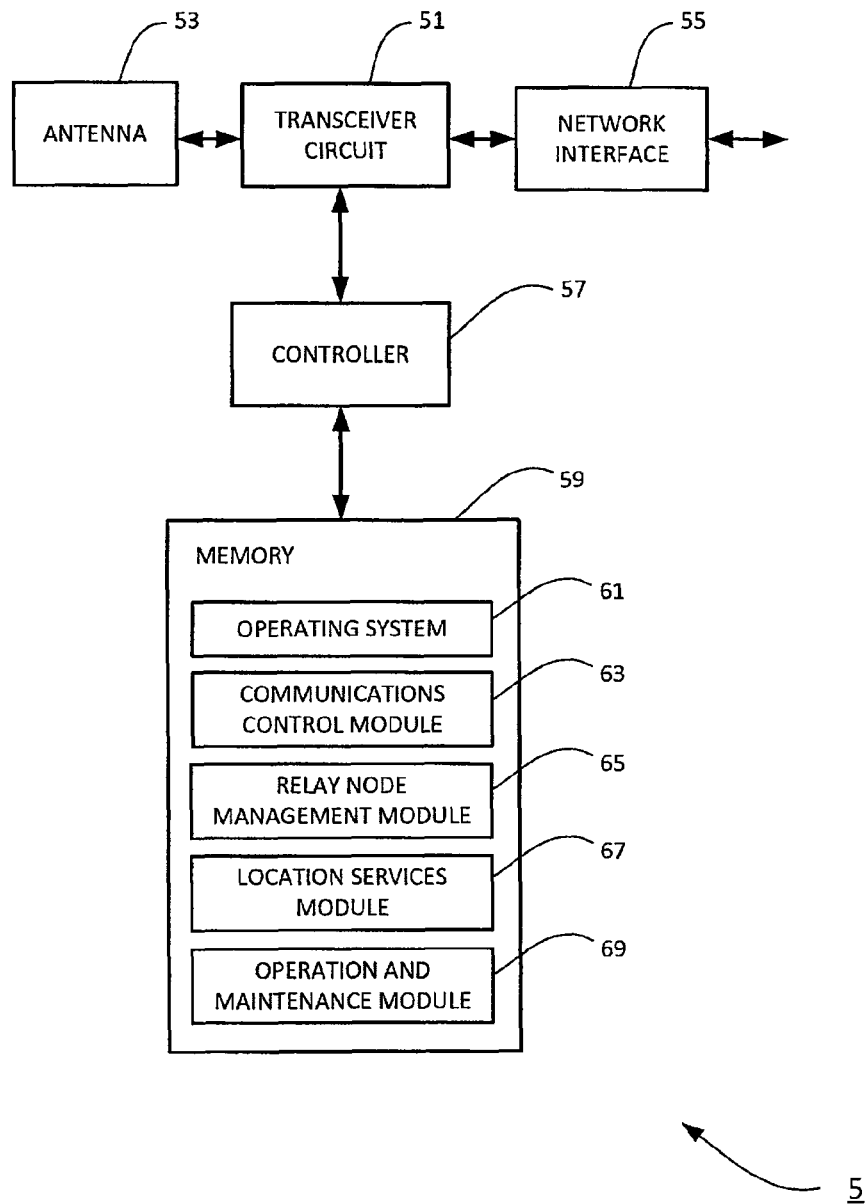
FIG. 3 is a block diagram illustrating the main components of a donor base station forming part of the system shown in FIG. 1.

FIG. 3 is a block diagram illustrating the main components of a base station, such as the donor base station 5-1 shown in FIG. 1. The base station 5 is a fixed communications node providing services to user equipment 4 within its coverage area. In the embodiments according to the present invention, the base station 5 is communicating with the user equipment 4 via a (mobile) relay node 3. As shown, the base station 5 includes a transceiver circuit 51 which is operable to transmit signals to, and to receive signals from the relay node 3 via at least one antenna 53. The base station 5 is also operable to transmit signals to and to receive signals from the LCS Server 11 of the core network 7 and other base stations via a network interface 55. The operation of the transceiver circuit 51 is controlled by a controller 57 in accordance with software stored in memory 59. The software includes, among other things, an operating system 61, a communications control module 63, a relay node management module 65, a location services module 67, and an operation and maintenance module 69.

The communications control module 63 is operable to control communications between the base station and the relay nodes 3, user equipment 4, and the network devices such as the MME 9 and the LCS Server 11.

The relay node management module 65 is operable to control the connection between the base station 5 and the relay node 3 attached thereto.

The location services module 67 is operable to provide information to the LCS Server 11 necessary to obtain geographical location of user equipment. The location services module 67 is operable, for example, to indicate to the LCS Server 11 that the relay node 3 attached to this base station is operating mobile cells and to provide a list of cell identifiers identifying these mobile cells.

The operations and maintenance module 69 is operable to interface with an OAM entity in the core network 7 for setting up and storing operating parameters of the base station 5. The operating parameters stored by the operation and maintenance module 69 include, for example, a list of relay node cells and their unique identifiers (e.g. ECGIs) and configuration data for the relay node cells including mobile cells and supported positioning methods.

LCS Server

Figure 4:
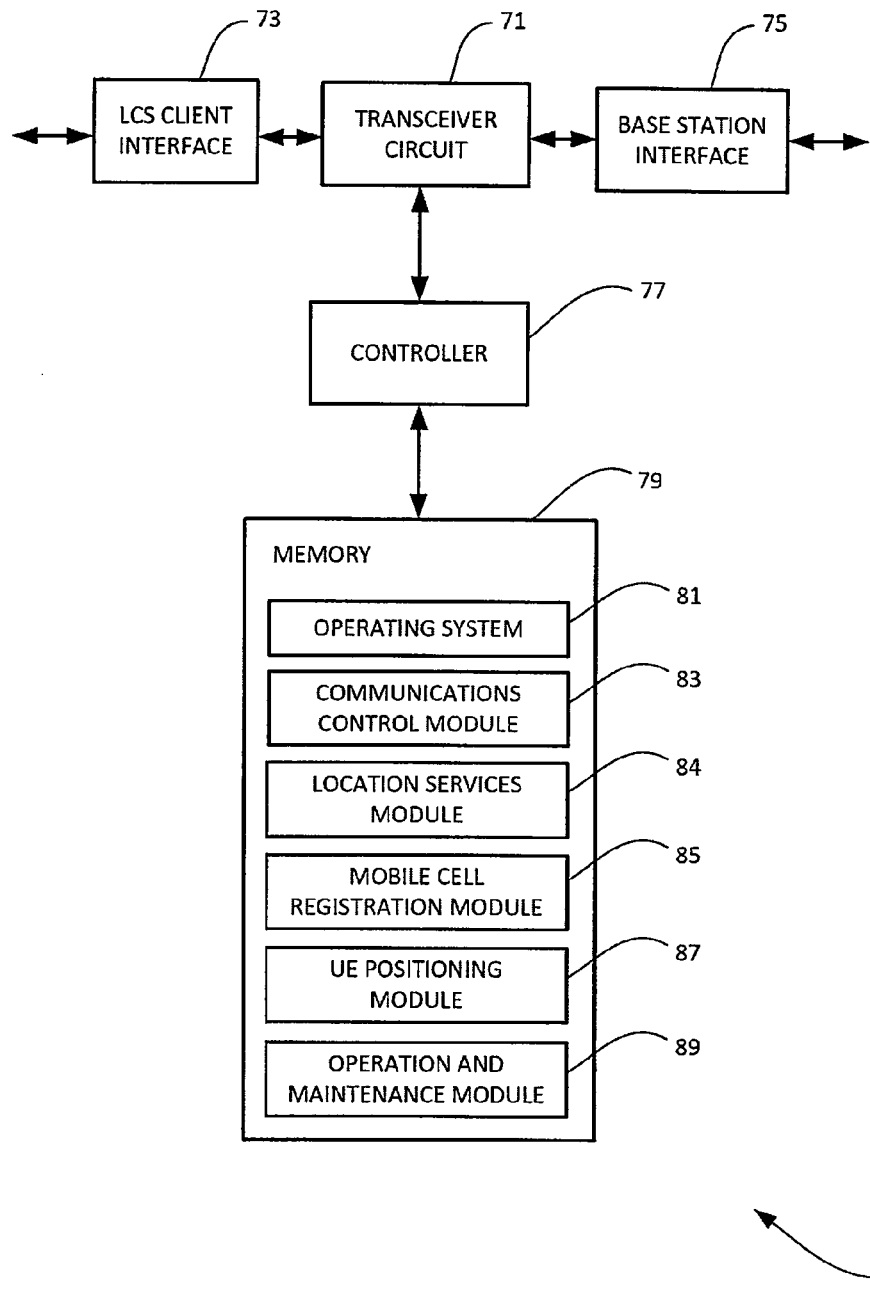
FIG. 4 is a block diagram illustrating the main components of a location services server forming part of the system shown in FIG. 1.

FIG. 4 is a block diagram illustrating the main components of the location services server entity 11 shown in FIG. 1. The as mentioned above, the LCS Server 11 is a communications node that provides location services with respect to target user equipment 4 by obtaining information about their current geographical location within the mobile (cellular) telecommunication system 1 and providing such information to an LCS Client 13 entity upon request. As shown, the LCS Server 11 includes a transceiver circuit 71 which is operable to transmit signals to, and to receive signals from an LCS Client 13 via the LCS client interface 73, and to transmit signals to, and to receive signals from the base stations 5 via a base station interface 75. The operation of the transceiver circuit 71 is controlled by a controller 77 in accordance with software stored in memory 79. The software includes, among other things, an operating system 81, a communications control module 83, a location services module 84, a mobile cell registration module 85, a user equipment positioning module 87, and an operation and maintenance module 89.

The communications control module 83 is operable to control the communication with the various network devices such as the base stations 5, the LCS Client 13, the OAM unit and the MME 9.

The location services module 84 is operable to receive from the base station 5 and/or the relay node 3 information needed for obtaining geographical location of user equipment. The location services module 67 is operable, for example, to receive an indication that a relay node 3 serving the target user equipment is operating mobile cells and to receive a list of cell identifiers identifying these mobile cells.

The mobile cell registration module 85 is operable to store and maintain a list of mobile cells.

The user equipment positioning module 87 is operable to position user equipment. In this example, the user equipment positioning module 87 is operable to access and take into account in positioning the user equipment information received by the location services module 84 and/or stored by the mobile cell registration module 85.

The operation and maintenance module 89 is operable to interface with an OAM entity in the core network 7 for setting up and storing operating parameters of the LCS Server 11. The operating parameters stored by the operation and maintenance module 69 include, for example, a list of relay node cells and their unique identifiers (e.g. ECGIs) and configuration data for the relay node cells including mobile cells and supported positioning methods.

In the above description, the mobile relay node 3, the donor base station 5, and the LCS Server 11 are described for ease of understanding as having a number of discrete modules (such as the communications control modules and the location services modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Location Services Architecture

Figure 5:
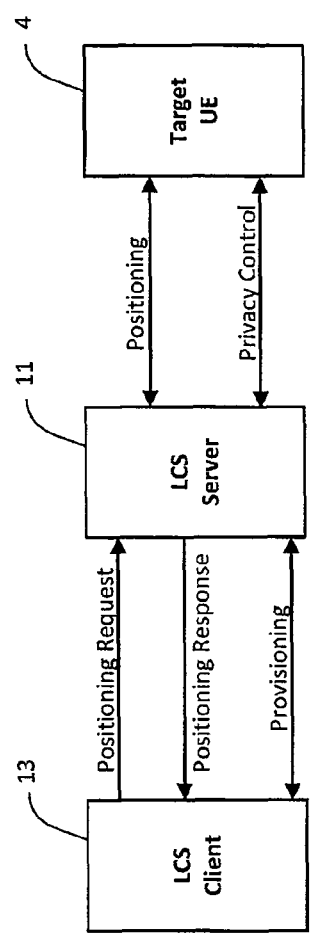
FIG. 5 schematically illustrates a reference model based on which location services can be provided in the system shown in FIG. 1.

FIG. 5 schematically illustrates a reference model based on which location services can be provided in the system shown in FIG. 1. As shown, an LCS Client 13 requests position information of a target mobile telephone 4 from an LCS Server 11. Based on the received request, positioning is performed by the LCS Server 11 and the target mobile telephone 4, which typically takes into account the geographical location of the cell or the base station currently serving the target mobile telephone 4.

The LCS Server 11 and the target mobile telephone 4 also perform privacy control so that any positioning response sent back to the LCS Client 13 may take into account the privacy settings chosen by the user of the target mobile telephone 4 or pre-set by the network operator. Therefore, although the location information concerns the geographical location of a target mobile telephone 4, the provisioning of such information is carried out between the LCS Client 13 and the LCS Server 11. However, in certain cases, the LCS Client 13 might be implemented in the target mobile telephone 4 itself. In any case, the LCS Server 11 obtains a geographical location for the target mobile telephone 4, during which it takes into account the current location of a mobile relay node 3 (or base station 5) serving the target mobile telephone 4.

Although not shown, there are other network elements in the communication link between the LCS Server 11 and the target mobile telephone 4, such as a base station, or in this example, a donor base station 5 and a mobile relay node 3. Moreover, although the positioning function is shown as being performed by the LCS Server 11 and a target mobile telephone 4, in a typical implementation, it can be performed without user equipment involvement, e.g. between the LCS Server 11 and a base station serving the target mobile telephone 4.

Figure 6:
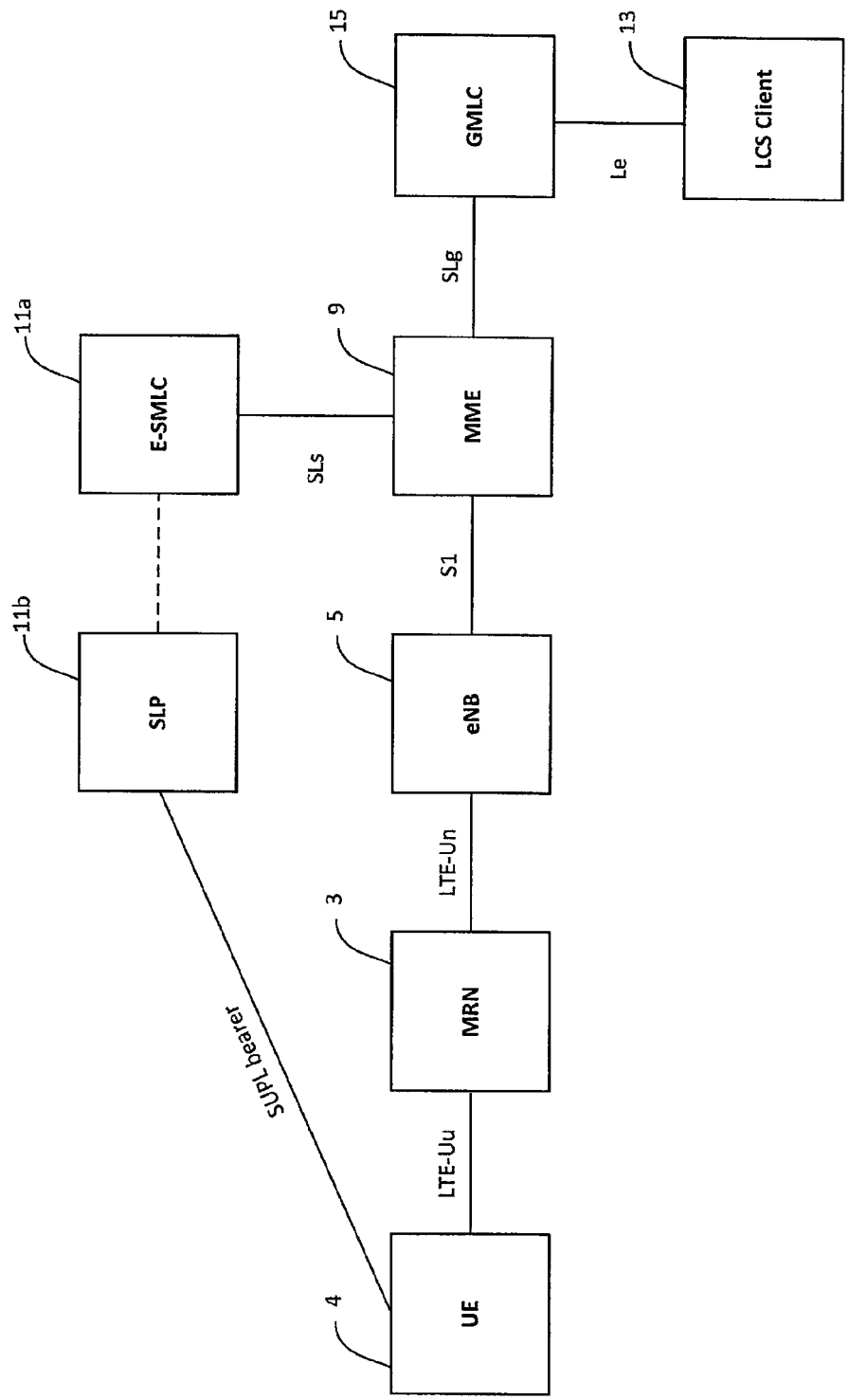
FIG. 6 schematically illustrates a positioning architecture in a communication system operating according to the LTE standards.

FIG. 6 schematically illustrates a positioning architecture in a communication system operating according to the LTE standards. In this architecture, the Enhanced Serving Mobile Location Centre (E-SMLC) 11a and the SUPL (Secure User Plane Location) Location Platform (SLP) 11b nodes perform the LCS Server 11 functionality, i.e. manage the overall co-ordination and calculations required for obtaining the location of a target mobile telephone 4. The E-SMLC 11a and the SLP 11b nodes can be implemented as two stand-alone elements or they can be implemented as part of any other network element(s). Alternatively, the E-SMLC 11a and the SLP 11b entities could be combined as one unit, in which case they are referred to as an E-SMLC/SLP entity.

If implemented separately, the SLP 11b can be connected to the E-SMLC 11a via any standard or proprietary interface. Communication between the SLP 11b and user equipment 4 is effected via a so called SUPL bearer. There are standard interfaces provided between the user equipment 4 and the mobile relay node 3, between the mobile relay node 3 and the donor base station 5, and between the donor base station 5 and the MME 9.

At the other end of the LTE positioning architecture, the LCS Client 13 communicates with a Gateway Mobile Location Centre (GMLC) 15 using the Le interface. The GMLC 15 is connected to the MME 9 via the SLg interface. Finally, the MME 9 communicates with the E-SMLC 11a via the SLs interface.

Figure 7A:
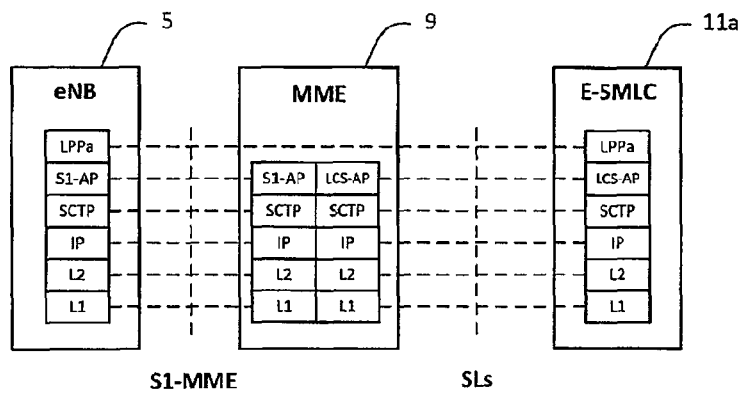
FIG. 7a schematically illustrates an example protocol stack for use in the system shown in FIG. 1, when a relay node is not involved.

FIG. 7a schematically illustrates an example LPPa protocol stack for use in the system shown in FIG. 1 when a relay node 3 is not involved.

The LTE Positioning Protocol Annex (LPPa) is implemented between the E-SMLC 11a and the base station serving the user equipment for which positioning is to be performed (in this example eNB 5).

LPPa messages are communicated using the SLs protocol between the E-SMLC 11a and the MME 9. Between the MME 9 and the base station 5, LPPa messages are carried as a Protocol Data Unit (PDU) within the S1 signalling.

From lowest to highest layer, the E-SMLC 11a and the MME 9 both implement the Layer-1 Protocol (L1), Layer-2 Protocol (L2), Internet Protocol (IP), Stream Control Transmission Protocol (SCTP), and the LCS Application Protocol (LCS-AP). The same protocol stack is found between the MME 9 and the base station 5 as well, except that instead of the LCS-AP, the S1 Application Protocol (S1-AP) is used. On the highest layer of the protocol stack, LPPa messages are communicated between the E-SMLC 11a and the base station 5 (routed transparently through the MME 9).

Over the S1-MME interface, the LPPa PDUs are exchanged using the following S1-AP messages:
  DOWNLINK UE ASSOCIATED LPPA TRANSPORT,
  UPLINK UE ASSOCIATED LPPA TRANSPORT,
  DOWNLINK NON UE ASSOCIATED LPPA TRANSPORT, and
  UPLINK NON UE ASSOCIATED LPPA TRANSPORT.

The 'UE associated' messages listed above are used for transferring LPPa messages relating to the positioning of a specific UE. The 'Non-UE associated' messages are used for transferring LPPa messages relating to the provision of assistance data to the mobile telephone 3, from the base station, to support OTDOA positioning for any mobile telephone.

Figure 7B:
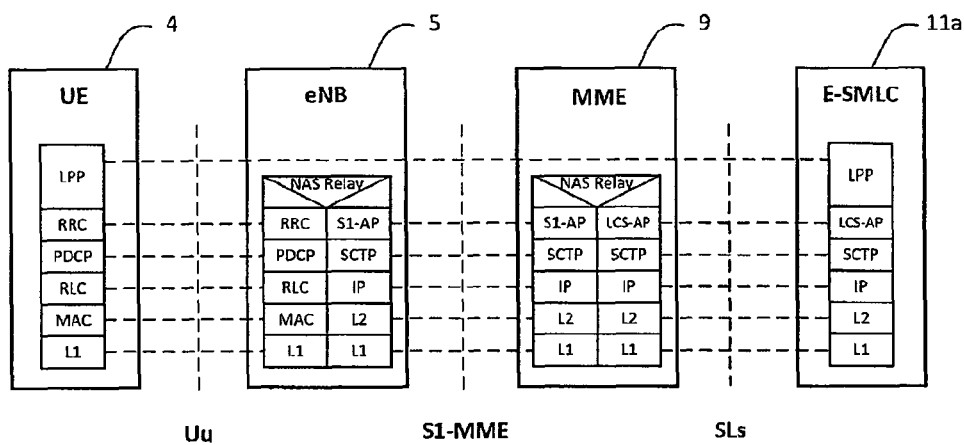
FIG. 7b schematically illustrates another example protocol stack for use in the system shown in FIG. 1, when a relay node is not involved.

FIG. 7b schematically illustrates another example LPP protocol stack for use in the system shown in FIG. 1 when a relay node 3 is not involved.

The LTE Positioning Protocol (LPP) is implemented between the E-SMLC 11a and the target mobile telephone 4. LPP messages are also communicated using the previously mentioned SLs and S1-MME interfaces. However, between the base station 5 and the mobile telephone 3, LPP messages are exchanged via the Uu interface.

From lowest to highest layer, the mobile telephone 4 and the base station 5 both implement the Layer-1 protocol, MAC protocol, Radio Link Control (RLC) protocol, Packet Data Convergence Protocol (PDCP), and the RRC protocol. At the highest layer illustrated, the mobile telephone 4 and the E-SMLC use the LPP protocol to exchange messages, which are carried either as NAS signalling or as user data. Either way, LPP is transparent for both the base station 5 and the MME 9, which act as NAS relays.

Figure 7C:
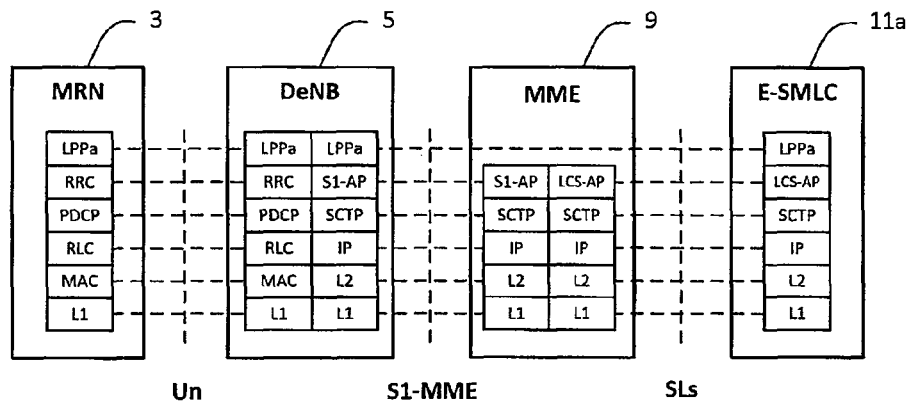
FIG. 7c schematically illustrates an example protocol stack for implementing embodiments of the invention, when a relay node is involved.
Figure 7D:
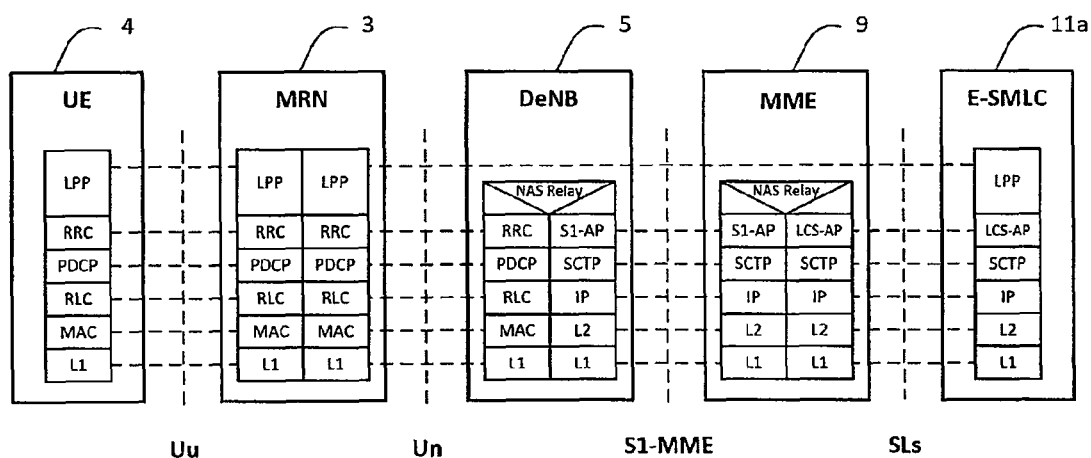
FIG. 7d schematically illustrates another example protocol stack for implementing embodiments of the invention, when a relay node is involved.

FIGS. 7c and 7d schematically illustrate example LPPa and LPP protocol stacks respectively, for implementing embodiments of the invention when a relay node 3 is involved. Since the relay node 3 appears to the base station 5 as a piece of user equipment, the Un interface between them mirrors the protocol stack used on the Uu interface between the base station 5 and the mobile telephone 4 (as described above with reference to FIG. 7b). When a relay node 3 is present, the Uu interface is used between the mobile telephone 4 and the relay node 3 (which appears as a base station to the mobile telephone 4). As illustrated in FIGS. 7c and 7d, the relay node supports the LPPa and/or LPP protocols, respectively.

LPPa Based Information Provision

Figure 8:
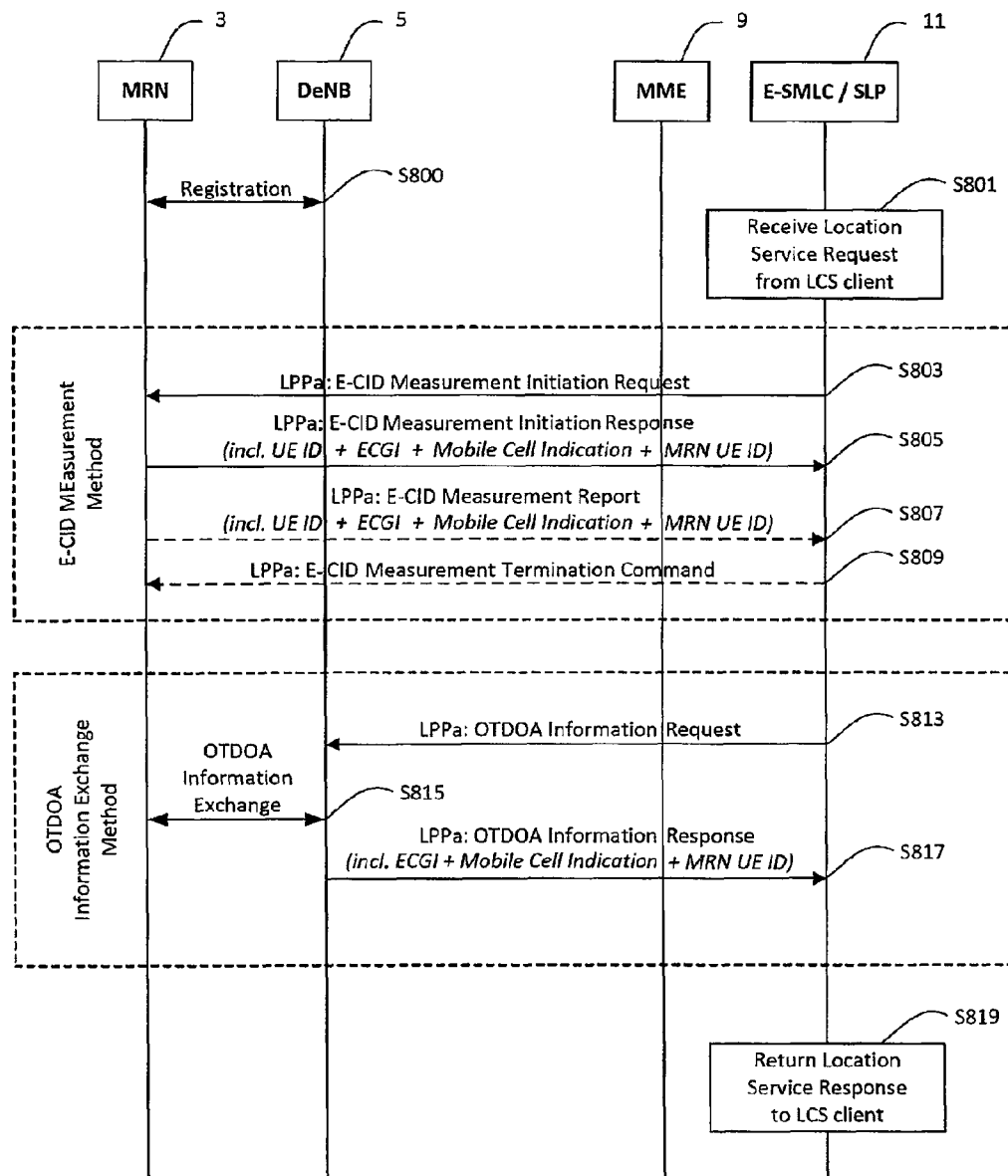
FIG. 8 shows an example timing diagram illustrating a method performed by components of the communication system when a request for positioning information is received.

FIG. 8 shows an example timing diagram illustrating a method performed by components of the communication system 1, using the LPPa protocol, when a request for positioning information is received.

In this embodiment, as shown in the initial step s800, the MRN 3 registers (using its DeNB registration module 44) with a donor base station 5 in order to provide services for mobile telephones or other such user equipment within its cell(s). In step s801, the location services module 84 of the LCS Server 11 (such as an E-SMLC/SLP) receives a positioning request concerning a target item of user equipment (e.g. a mobile telephone 4). The positioning request is generated by an LCS client 13 (which can be implemented in e.g. the mobile telephone 4, the base station 5, the MME 9, the GMLC 15, etc.) and is delivered to the LCS Server 11 using known communication techniques. The location services module 84 then processes the positioning request and initiates procedures according to one of the available positioning methods.

As mentioned earlier, one of these positioning methods is based on E-CID measurement. If the location services module 84 follows this method, as shown in step s803, the LCS Server 11 generates and sends to the relay node 3 an 'E-CID Measurement Initiation Request' formatted according to the LPPa protocol. As this is a UE-dedicated procedure, the LPPa PDUs are passed transparently by MME 9 and DeNB 5 to the MRN 3.

In step s805, the relay node 3 generates and sends back to the LCS Server 11 an 'E-CID Measurement Initiation Response' message, also formatted according to the LPPa protocol. The relay node 3 also includes, in this response message, an indication that the target mobile telephone 4 is located in a mobile cell (e.g. using a 'Mobile Cell Indication' IE or the like) and also includes information identifying the target mobile telephone 4 (e.g. UE ID), the cell identifier (e.g. ECGI) and information identifying the mobile relay node 3 as if it were an item of user equipment (e.g. an MRN UE ID). In this embodiment, the included information is embedded in an information element in the 'E-CID Measurement Initiation Response' message, e.g. in an 'E-UTRAN Access Point Position' or other information element.

Optionally, the current geographic coordinates of the cell serving the target mobile telephone 4 are also provided in an information element, such as the 'E-UTRAN Access Point Position' IE (if known e.g. from a positioning module, or the like, provided in the MRN). However, if such geographic coordinates are not provided (e.g. because they are not available), the UE positioning module 87 of the LCS Server 11 can, optionally, derive a position for the MRN and/or the cell(s) it operates by performing positioning of the MRN 3 as if it were user equipment operating in the cell of the DeNB.

Depending on the type of measurement requested in step s803, e.g. in case of a recurring or periodic location request, the MRN 3 may send a further 'E-CID Measurement Report' LPPa message (or messages) to the LCS Server 11. The E-CID Measurement Report may include, for example, measurements for improving accuracy of the relative positioning of the mobile telephone within the cell such as E-UTRAN measurements of base station (or MRN) receiver/transmitter time differences and/or UE measurements reported to the base station (e.g. Reference signal received power (RSRP), Reference Signal Received Quality (RSRQ), UE receiver/transmitter time difference or the like).

As shown in step s807, such message(s) may also optionally carry the 'E-UTRAN Access Point Position' information element and hence the latest geographic coordinates of the cell serving the target mobile telephone 4 (if known), the information identifying the target mobile telephone 4 (e.g.

UE ID), the cell identifier (e.g. ECGI) and/or information identifying the mobile relay node 3 (e.g. an MRN UE ID) mentioned in step s805.

As shown in step s809, the LCS Server 11 terminates the E-CID measurement procedure using an appropriate termination request (e.g. the 'E-CID Measurement Termination Command' LPPa message described in the relevant standards).

The LCS Server 11 (i.e. the location services module 84) can also select one of the other positioning methods instead of (or in addition to) the 'E-CID Measurement' method described with respect to steps s803 to s809. For example, the LCS Server 11 can use the 'OTDOA Information Exchange' method introduced above and as illustrated in steps s813 to s817 of FIG. 8. In this case, as shown in step s813, the LCS Server 11 generates and sends, to the location services module 67 of the donor base station 5, an 'OTDOA Information Request' formatted according to the LPPa protocol. As set out in the 3GPP TS36.300 standard (section 4.7.4), all non-UE-dedicated S1-AP procedures are terminated at the DeNB, and handled locally between the RN and the DeNB, and between the DeNB and the MME(s). Upon reception of an S1 non-UE-dedicated message from an MME, therefore, the DeNB may trigger corresponding S1 non-UE-dedicated procedure(s) to an RN such as the MRN 3.

Therefore, in step s815, when the OTDOA information exchange non-UE-dedicated messages are received and terminated at the location services module 67 of the DeNB, 5 corresponding messages to the MRN 3 are, optionally, triggered. Next, in step s817, the DeNB 5 responds to the LCS Server 11 by generating and sending a response message (in this example an 'OTDOA Information Response' LPPa message) to the E-SMLC/SLP 11 via the MME 9. In this message, the DeNB 5 includes the details of each cell (of the MRN 3) which broadcasts Positioning Reference Signals (PRS). The geographic coordinates of the cell serving the target mobile telephone 4, if known, may also be provided in the 'E-UTRAN Access Point Position' IE. The DeNB 5 also indicates, within the response message (for example within a modified version of the 'OTDOA Cell Information' IE), that the serving cell is a mobile cell by including a (e.g. using a 'Mobile Cell Indication' IE or the like) an identification (MRN UE ID) of the relay node 3 in addition to a cell identifier (e.g. the ECGI). The MRN UE ID (or other suitable identifier) enables the LCS Server 11 to perform positioning of the MRN 3, by treating it as user equipment in the cell of the DeNB 5, in order to determine the latest geographical location of the mobile cell.

In step s819, after the LCS Server 11 has received the necessary information (i.e. the information element(s) included in steps s805, s807, and/or s817), it can determine the latest position of the cell operated by the MRN 3 from geographical coordinates provided to it, or by performing a positioning procedure (i.e. using its UE positioning module 87) in which the MRN 3 (identified by the MRN UE ID) is treated as target user equipment operating in the cell of the DeNB 5. Hence a position for the target user equipment (in this example a mobile telephone 4) can be determined and the LCS server 11 generates and returns a location service response to the LCS Client that originally requested the positioning service for the target mobile telephone 4.

Mobile Cell Dedicated Procedure Based Information Provision

Rather than using the modified LPPa procedure described above with reference to FIG. 8, in the following examples, information relating to the MRN 3 and its mobile nature is provided in a new, mobile cell dedicated, LPPa based information exchange procedure (referred to in the following description as a 'Mobile Cell Information Exchange' procedure). It will be appreciated that the Mobile Cell Information Exchange procedures may be implemented in the communication system 1 as an alternative to implementing a modified LPPa procedure (e.g. as shown and described with reference to FIG. 8) or a modified LPP procedure (e.g. as shown and described with reference to FIG. 10) it may also be implemented in addition to implementing modified LPPa and/or LPP procedures.

Figure 9A:
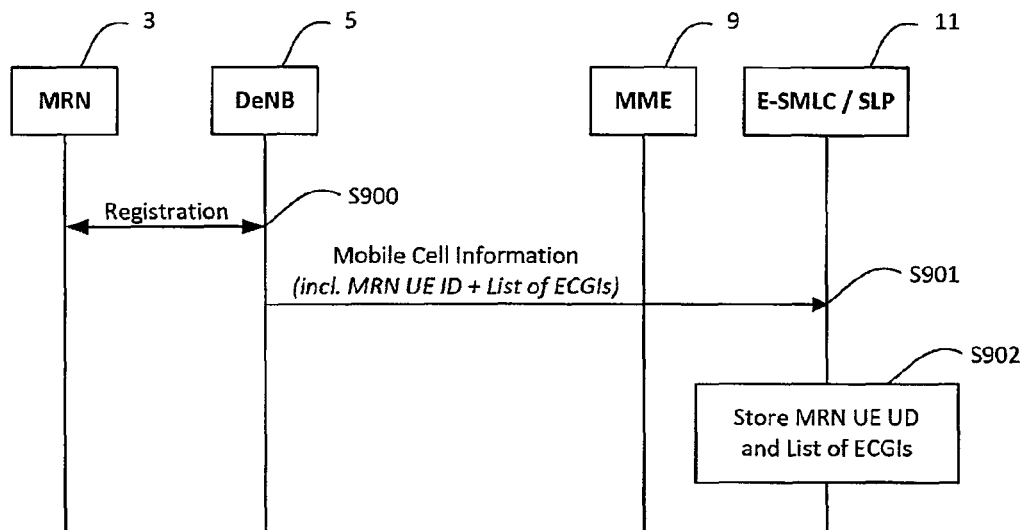
FIG. 9a illustrates an example signalling diagram for updating the LCS Server when a change in connection status occurs between the relay node and the base station shown on FIG. 1.
Figure 9B:
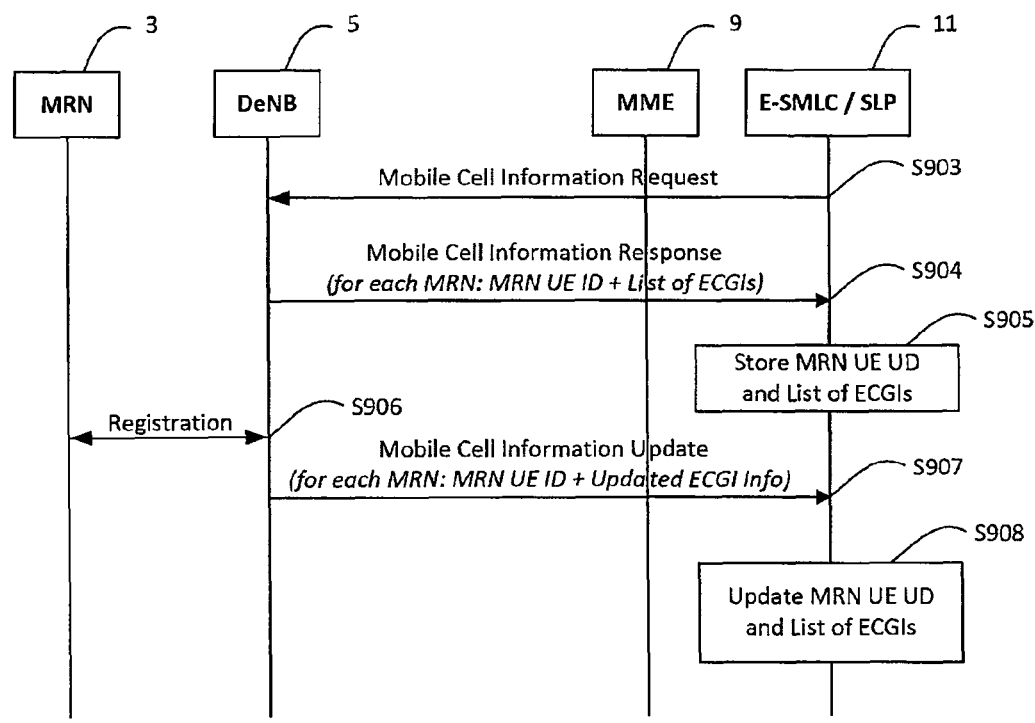
FIG. 9b illustrates another example signalling diagram for updating the LCS Server when a change in connection status occurs between the relay node and the base station shown on FIG. 1.

FIGS. 9*a* and 9*b* each illustrate an example signalling diagram for updating the LCS Server using a different respective variation of a 'Mobile Cell Information Exchange' procedure. These procedures have particular benefits when a change in connection status occurs between the mobile relay node and the donor base station shown on FIG. 1 due to movement of the vehicle in which the MRN is located.

Specifically, in this example, each DeNB 5 is adapted to inform the LCS Server 11 when there is a change (e.g. due to a handover and/or due to a relay node moving out of coverage) in the list of mobile cells served by each MRN 3 served by that DeNB 5. For example, the old DeNB can use the 'Mobile Cell Information Exchange' procedure to indicate to the LCS server 11 that a MRN 3 is no longer served by the old base station 5. Further, the new DeNB to which the MRN 3 is handed over can use the 'Mobile Cell Information Exchange' procedure to indicate this to the LCS Server 11 so that positioning procedures can be initiated via the new DeNB.

In the example illustrated in FIG. 9*a*, it is assumed that mobile telephones 4 within the cell(s) of the MRN 3 are provided access to the communication network 1 via a DeNB 5. In step s900, the MRN 3 registers with the DeNB 5, and indicates to the DeNB a list of its cells. After the registration is complete, in step s901, location services module 67 of the DeNB 5 generates and sends an information exchange LPPa message (labelled 'Mobile Cell Information') to the mobile cell registration module 85 of the LCS Server 11 (via the MME 9). The message includes information identifying the relay node as it were an item of user equipment (e.g. MRN UE ID) and information identifying the cell(s) operated by the relay node (e.g. ECGI, or list of ECGIs). Although not explicitly shown, the 'Mobile Cell Information' LPPa message, in this example, may be sent as a container using an 'UPLINK NON UE ASSOCIATED LPPA TRANSPORT' message over the S1-MME interface and using an 'LCS-AP Connectionless Information' message over the SLs interface.

In step s902, the LCS Server 11 (i.e. the mobile cell registration module 85) stores the received information identifying the relay node and the list of mobile cells for future use, e.g. when responding to a positioning request concerning a target mobile telephone 4 served by one of these mobile cells.

In the example of FIG. 9*b*, the information exchange procedure is initiated by the mobile cell registration module 85 of the LCS Server 11 (the E-SMLC/SLP in this example), in step s903, by sending a information request LPPa message (referred to as a 'Mobile Cell Information Request' message) to the DeNB 5 effectively to request that the DeNB 5 provide information about any mobile cells under its control. In step s904, the DeNB 5 responds to the request by generating and sending a response LPPa message (referred to as a 'Mobile Cell Information Response' message) to the LCS Server 11. The Mobile Cell Information Response message includes, for each MRN currently operating under the control of the DeNB, information identifying that MRN (e.g. MRN UE ID) and information identifying the cell(s) operated by that MRN (e.g. ECGI or list of ECGIs). Although not explicitly shown, the Mobile Cell Information Response message, in this example, may be sent as a container using a 'UPLINK NON UE ASSOCIATED LPPA TRANSPORT' message over the S1-MME interface and using the 'LCS-AP Connectionless Information' message over the SLs interface.

In step s905, the mobile cell registration module 85 updates the mobile cell information (information identifying that MRN (e.g. MRN UE ID) and information identifying the cell(s) operated by that MRN (e.g. ECGI or list of ECGIs)) received in step s904.

In step s906, a new MRN 3 registers with the DeNB 5, and indicates to the DeNB 5 a list of its cells. In response to this registration, the DeNB 5 (e.g. using its relay node management module 65 and its location services module 67) generates and sends an information update LPPa message (referred to as a 'Mobile Cell Information Update' message) to the LCS Server 11. The DeNB 5 includes in this message information identifying the new MRN 5 (e.g. a MRN UE ID) and information identifying the cell(s) operated by the MRN 5 (e.g. a ECGI, or list of ECGIs). The DeNB 5 includes, in the Mobile Cell Information Update message, information for each MRN currently registered with this donor base station 5, including the newly registered MRN 5.

Similarly, although not explicitly shown, in response to an MRN 3 leaving the DeNB 5 (e.g. by moving out of coverage or being handed over), the DeNB 5 (e.g. using its relay node management module 65 and its location services module 67) generates and sends an information update LPPa message to the LCS Server 11 which includes, in the Mobile Cell Information Update message, information for each MRN currently registered with this donor base station 5, excluding the MRN 5 that has left the DeNB 5.

In step s908, the mobile cell registration module 85 updates the mobile cell information (information identifying that MRN (e.g. MRN UE ID) and information identifying the cell(s) operated by that MRN (e.g. ECGI or list of ECGIs)) received in step s907.

The provision of a Mobile Cell Information Update message may be repeated each time a new relay node registers with, or leaves, the DeNB 5.

The LCS Server 11 then may thus use the stored mobile cell information when its location services module 84 is responding to a positioning request concerning a target mobile telephone 4 served by one of these mobile cells.

Once the LCS Server 11 obtains information about the mobile cell(s) (as described above with respect to steps s901, s904, and s907), the location services module 84 can choose the most appropriate positioning method for a target mobile telephone 4 being served by such mobile cell(s). For example, the location services module 84 may decide that the current geographical position of the mobile cell (where known) is sufficient to locate the given target mobile telephone 4 served by a mobile cell, and therefore, for this target mobile telephone 4, it may use the geographical position of the MRN 3 instead of the actual geographical position of the given mobile telephone 4.

As mentioned above, the dedicated mobile information exchange procedures have particular benefits when a change in connection status occurs between the mobile relay node 3 and the donor base station 5 shown on FIG. 1 due to movement of the vehicle in which the MRN 3 is located.

LPP Based Information Provision

Figure 10:
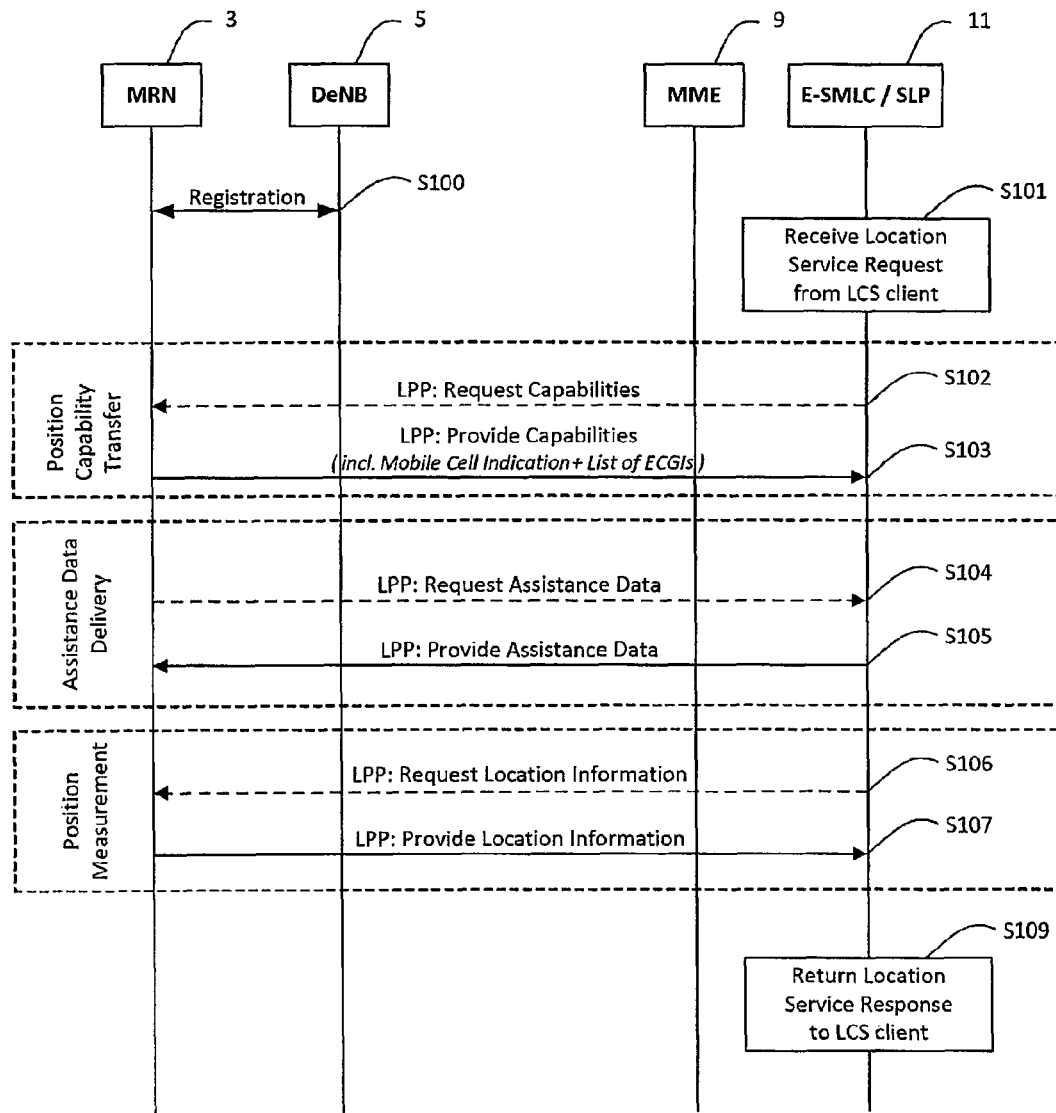
FIG. 10 shows another example timing diagram illustrating a method performed by components of the communication system when a request for positioning information is received.

FIG. 10 shows an example timing diagram illustrating a method performed by components of the communication system 1, using the LPP protocol, when a request for positioning information is received.

Initially, as shown in step s100, the MRN 3 performs registration with a DeNB 5. In step s101, the location services module 84 of the LCS Server 11 receives, from an LCS Client 13, and processes a location service request in which the identified target 'user equipment' is the MRN 3. The LCS Client 13 may, for example, be located in the mobile telephone 4, the base station 5, the MME 9, the GMLC 15, or the MRN 3 itself. In this example, at this stage in the process, the LCS Server 11 (E-SMLC/SLP) has no information available that allows it to determine that the target user equipment to which the location service request relates to be an MRN.

Based on the location service request, the LCS Server 11 initiates a positioning procedure with respect to the identified target user equipment (in this example the MRN 3). Therefore, in step s102, the UE positioning module 87 of the LCS Server 11 generates and sends a request for information identifying the capabilities of the 'user equipment' (e.g. a 'Request Capabilities' LPP message) to the MRN 3 as if the MRN 3 were user equipment in a cell of the DeNB 5.

In step s103, the MRN 3 operates, as user equipment would, and generates and sends a message providing the capability information (e.g. a 'Provide Capabilities' message) to the LCS Server 11. The MRN 3 includes, in this message, an indication that the 'user equipment' is operating a mobile cell (e.g. using a 'Mobile Cell Indication' information element) and information identifying the cell or list of cells that the MRN operates (e.g. ECGI or list of ECGIs). This information serves to inform the LCS Server 11 that the 'user equipment' is an MRN 3 and the identity of the mobile cell(s) being operated by it.

After this so called 'Position Capability Transfer' stage (i.e. steps s102 and s103), the rest of the procedure follows a procedure for positioning the target 'user equipment' comprising an 'Assistance Data Delivery' stage and a 'Position Measurement' stage.

In the Assistance Data Delivery stage assistance information is provided to the 'user equipment' (MRN 3) to assist the positioning measurement (in a 'Provide Assistance Data' LPP message from the LCS server 11 at step s105) either unsolicited or in response to an explicit request (in a 'Request Assistance Data' LPP message to the LCS server 11 at step s104) for the assistance information.

In the Position Measurement stage, location information is acquired by the MRN 3, as if it were user equipment, and provided to the LCS server 11 (in a 'Provide Location Information' LPP message to the LCS server 11 at step s107) either unsolicited or in response to an explicit request (in a 'Request Location Information' LPP message from the LCS server 11 at step s104) for the location information.

Accordingly, the 'Assistance Data Delivery' stage (i.e. steps s104 and s105) and the 'Position Measurement' stage (i.e. steps s106 and s107) are performed between the LCS Server 11 and the MRN 3 as if the MRN 3 were user equipment.

Once the geographical position of the MRN 3 has been obtained, the LCS Server 11 generates (using its location services module 84) and sends a location service response back to the LCS Client 13 requesting this information.

In this embodiment, any positioning method (e.g. OTDOA, E-CID, and A-GNSS methods) can be used to advantageously locate the MRN 3 and hence to obtain the position of user equipment served by the mobile cell(s) of this MRN 3.

LCS Server Discovery of MRN Position

It can be seen, therefore, that when the LCS server 11 has received information (using any of the above techniques) that indicates that a particular cell is mobile and that identifies an MRN UE ID and ECGI(s) associated with that mobile cell the LCS server 11 can take this into account when an LCS client 13 requests provision of positioning information for target user equipment 4 in the mobile cell.

Specifically, the LCS server 11 can obtain positioning information for the MRN 3 by treating it as target user equipment in the fixed cell of the DeNB 5.

Figure 11:
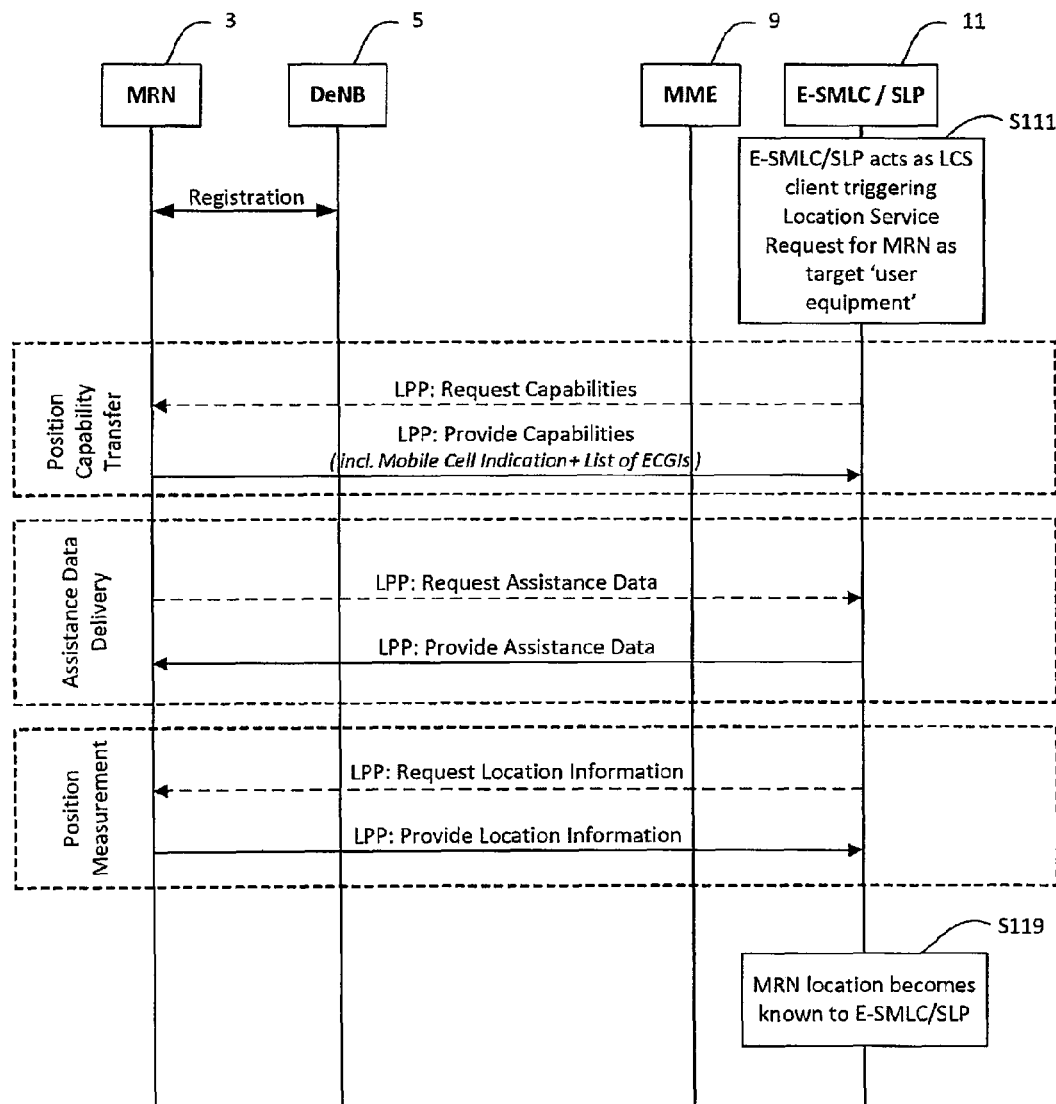
FIG. 11 shows an example timing diagram illustrating a method performed by components of the communication system when positioning a relay node.

For example, as illustrated in FIG. 11, the LCS Server 11 may obtain positioning information for the MRN 3 by implementing the LCS Client functionality in order to perform positioning of the MRN 3 as target 'user equipment' using essentially the same LPP procedure described in with reference to FIG. 10 except that the LCS server 11 acts as an LCS client at step s111 and therefore knows the position of the MRN 3 at step s119.

Similarly, the LCS server 11 can obtain positioning information for the MRN 3 by treating it as target 'user equipment' in the fixed cell of the DeNB 5 using the E-CID and/or OTDOA methods illustrated in FIG. 8 (or possibly A-GNSS methods where the MRN 3 is appropriately equipped).

Modifications and Alternatives

Detailed embodiments have been described above. As those skilled in the art will appreciate, a number of modifications and alternatives can be made to the above embodiments whilst still benefiting from the inventions embodied therein.

In addition to the embodiments described with reference to FIGS. 8, 9a, and 9b, an indication that a cell is mobile may be delivered to the LCS Server through O&M or other mechanisms external to the E-UTRAN. For example, the LCS Server may determine the geographic coordinates of a cell via a mechanism based on the procedure described in section 8.2.2 2 of the 3GPP TS 36.305 (Release 10) standard.

Rather than using an explicit indication that a cell is mobile, the indication may be provided indirectly, for example by using a Physical Cell Identity (PCI) which belongs to a range which is explicitly reserved for mobile relay cells. In order to enable the LCS Server to subsequently position the MRN, the MRN UE ID may be given to the LCS Server using the same O&M (or external) mechanism.

It will be appreciated that although the above embodiments provide a 'UE' identifier for the MRN 3 to allow positioning of the MRN 3 as if it were user equipment, in a simplified embodiment in which E-CIS and OTDOA methods of positioning the MRN 3 are not supported, the MRN UE ID need not be provided. In such a case the complexity of the E-SMLC/SLP requiring knowledge of the movements of mobile cells is avoided albeit that this may limit UE positioning to A-GNSS only.

However, in this simplified embodiment, unless the E-SMLC/SLP knows which cells are mobile it may still initiate LPP or LPPa procedures for these methods. Accordingly, there are still benefits to the E-SMLC/SLP knowing which cells are mobile.

Figure 12:
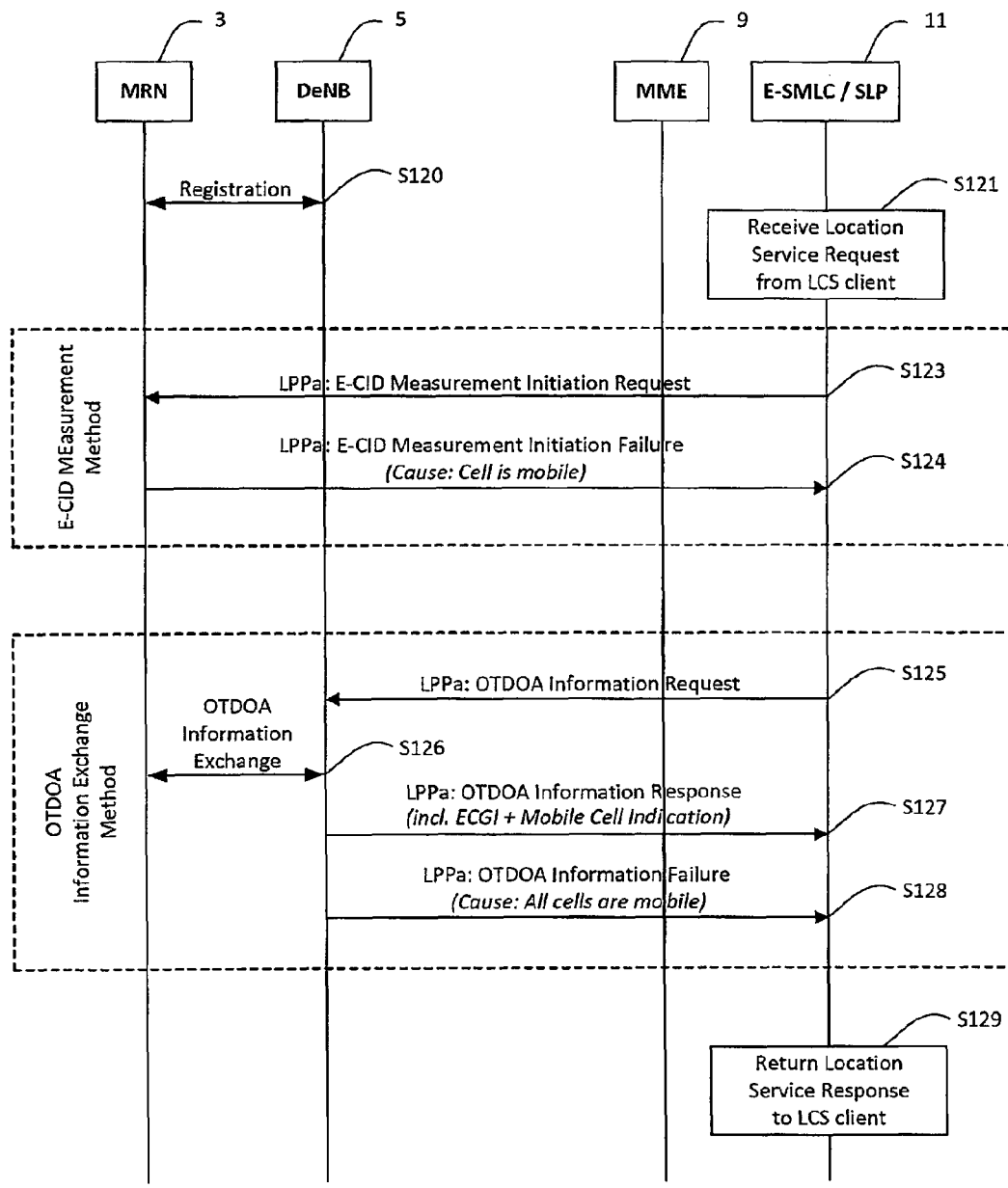
FIG. 12 shows an example timing diagram for informing the LCS Server that positioning measurements are not available in a mobile cell.

As illustrated in FIG. 12, for example, for an embodiment in which E-CID and OTDOA are not supported, an indication that a cell is mobile may be provided to the LCS Server by returning a specific failure cause (e.g. 'Cell is mobile' or 'All cells are mobile') in response to a positioning request.

The steps shown in FIG. 12 generally correspond to those shown in FIG. 8. However, in this case, a specific failure cause is provided by the relay node at step s124 by sending a failure message (e.g. a 'E-CID Measurement Initiation Failure' LPPa message) in response to the preceding 'E-CID Measurement Initiation Request' and/or by the donor base station at step s128 by sending a failure message (e.g. an 'OTDOA Information Failure' LPPa message) in response to the preceding 'OTDOA Information Request'. The failure message may include a specific 'cause' information element (e.g. 'Cell is mobile' or 'All cells are mobile') indicating that failure occurred because the cell in which the target user equipment is located was mobile.

As shown in step s127, in the case of an OTDOA procedure, the donor base station may respond to the LCS Server by generating and sending an 'OTDOA Information Response' LPPa message including an indication that the serving cell is a mobile cell (e.g. using a 'Mobile Cell Indication' IE or the like) in addition to a cell identifier (e.g. the ECGI). This will effectively inform the LCS Server that OTDOA location services are not available in the indicated cell(s) because the relay node is moving.

Figure 13A:
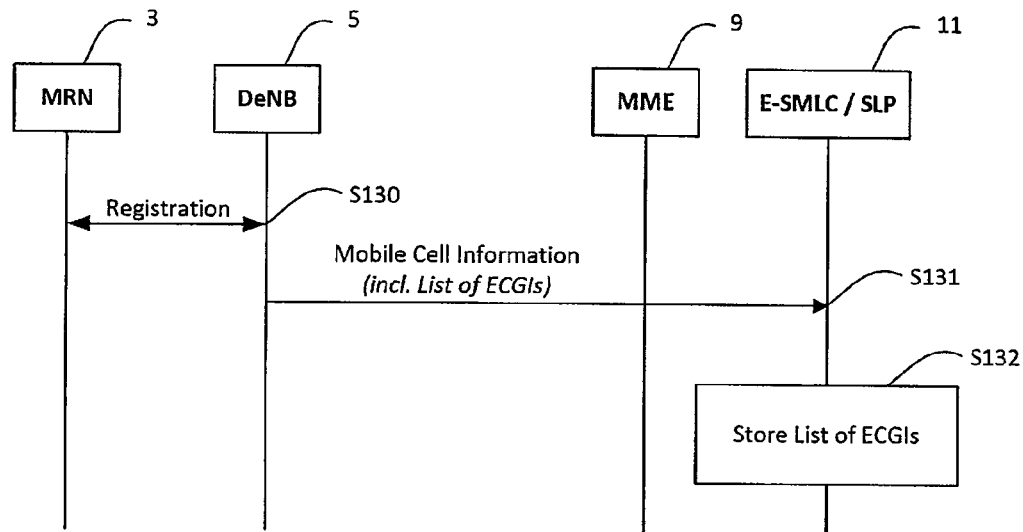
FIG. 13a shows an example timing diagram for informing the LCS Server about the list of mobile cells.

Rather than wait for an explicit failure message, however, as shown in FIG. 13a, the donor base station may proactively send (at step s131) to the LCS Server an indication of mobile cells (e.g. as a list of ECGIs) to inform the LCS Server about the relay node cells in which location services are not available using a dedicated Mobile Information Exchange procedure (similar to that shown in FIG. 9a but without providing an MRN UE ID). Similarly, as shown in FIG. 13b an indication of mobile cells may also be sent (at step s134) upon an explicit request received from the LCS Server and updated when there is a change in the MRN(s) and/or the associated mobile cells in a similar manner to that shown in FIG. 9b (albeit without providing the MRN UE ID(s)).

Figure 13B:
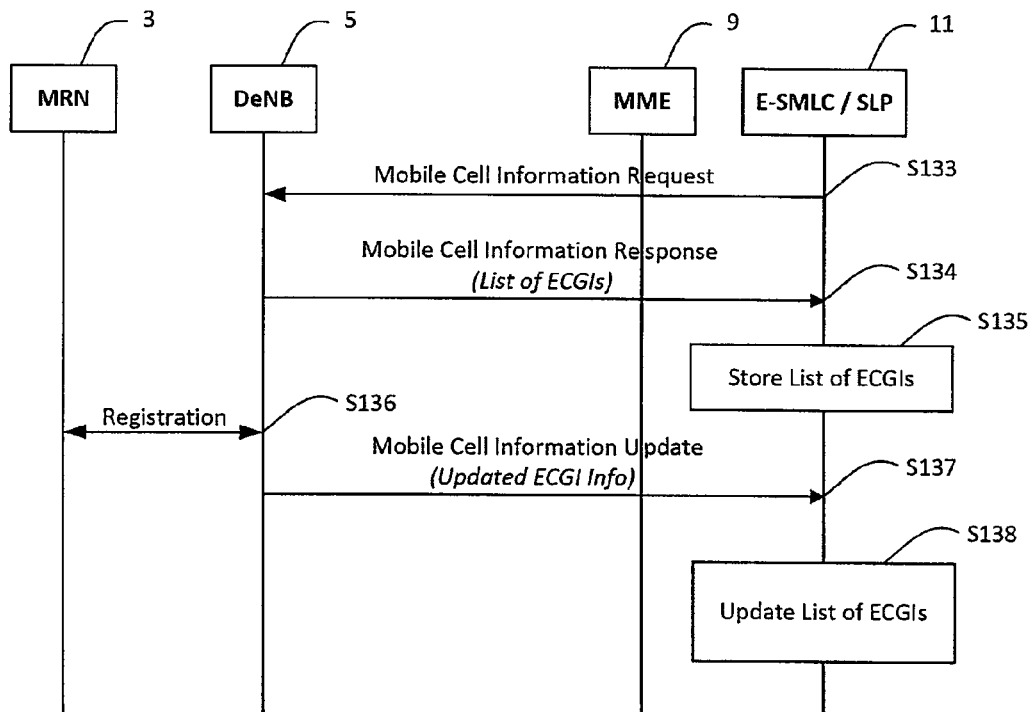
FIG. 13b shows another example timing diagram for informing the LCS Server about the list of mobile cells.

As explained above, a benefit associated with the procedures illustrated in FIGS. 12, 13a, and 13b is that the LCS Server can keep track of which cells are mobile within the communication system so that when a location request is received for a target item of user equipment located in one such cell, it need not attempt to position such user equipment using E-CID or OTDOA procedures, thus avoiding unnecessary signalling and preventing positioning failures in cells which are already known to be mobile cells.

However, it will be appreciated that, when receiving a failure cause or mobile cell indication, the LCS Server may initiate the procedures described with reference to FIG. 11 in order to position the mobile cell(s) of the relay node serving the target user equipment.

Figure 14:
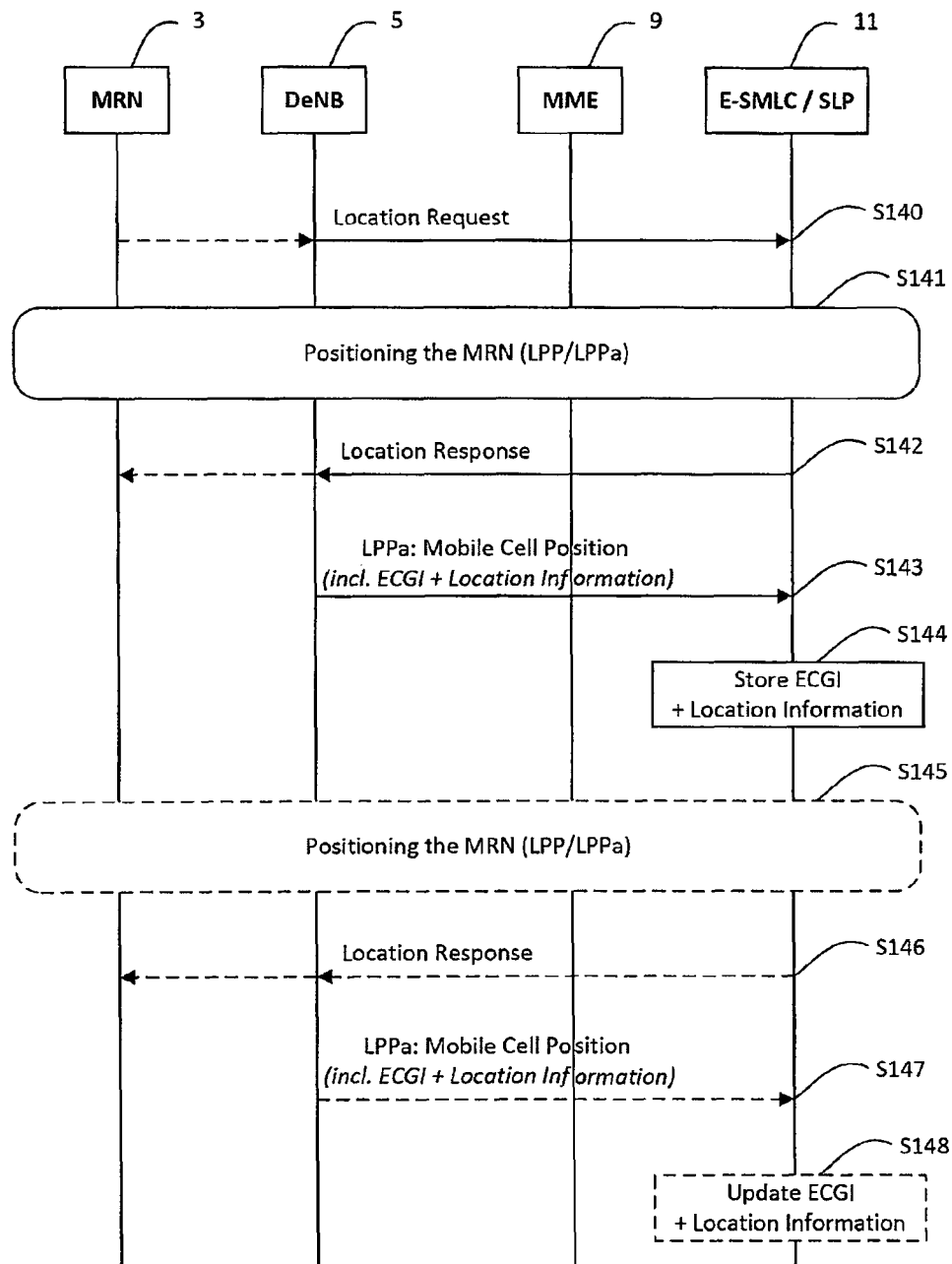
FIG. 14 shows another example timing diagram for autonomous initiation of a positioning request by a particular entity.

FIG. 14 illustrates an embodiment, in which the positioning request for a mobile relay node is initiated autonomously either by the donor base station or by the relay node itself, by sending a 'Location Request' message, at step s140, to the LCS Server. For example, the relay node may generate and send this message (via the donor base station) as soon as it performs start-up. Alternatively, the donor base station may generate and send the 'Location request' message as soon as the relay node is connected to one of its cells. In either case, the LCS Server initiates and performs, generally at step s141, positioning of the relay node as it were an item of user equipment using any of the available positioning techniques (e.g. E-CID, OTDOA, and A-GNSS methods). In step s142, the LCS Server provides the location of the relay node by generating and sending a 'Location Response' message to the donor base station (and optionally to the relay node).

Since the LCS Servers in the network need to know the geographical location of the relay node's cell(s) (e.g. in order to carry out subsequent location requests for user equipment served therein), in step s143, the donor base station generates and sends a 'Mobile Cell Position' LPPa message, in which it includes a unique identification of the cell(s) (e.g. ECGI or list of ECGIs) and the latest geographic location of the relay node. This message is forwarded, via the MME, to each E-SMLC/SLP to which it is attached. This information may also include information such as current geographic coordinates with timestamp, speed and direction of travel, and additionally, pre-defined route information if known to the MRN or DeNB. In step s144, the LCS Server stores the received information for future use.

Optionally, as shown at step s145, the positioning of the MRN is repeated (e.g. periodically or upon a request by either one of the MRN, the DeNB, and the LCS Server) so that an updated list of cells and updated geographical location can be provided, at step s147, to the LCS Server(s). In step s148, the LCS Server stores the updated cell and location information. It will be appreciated that if there is only one LCS Server in the communication system, or it is not necessary to update all LCS Servers, steps s143 and s147 may be omitted.

Figure 15:
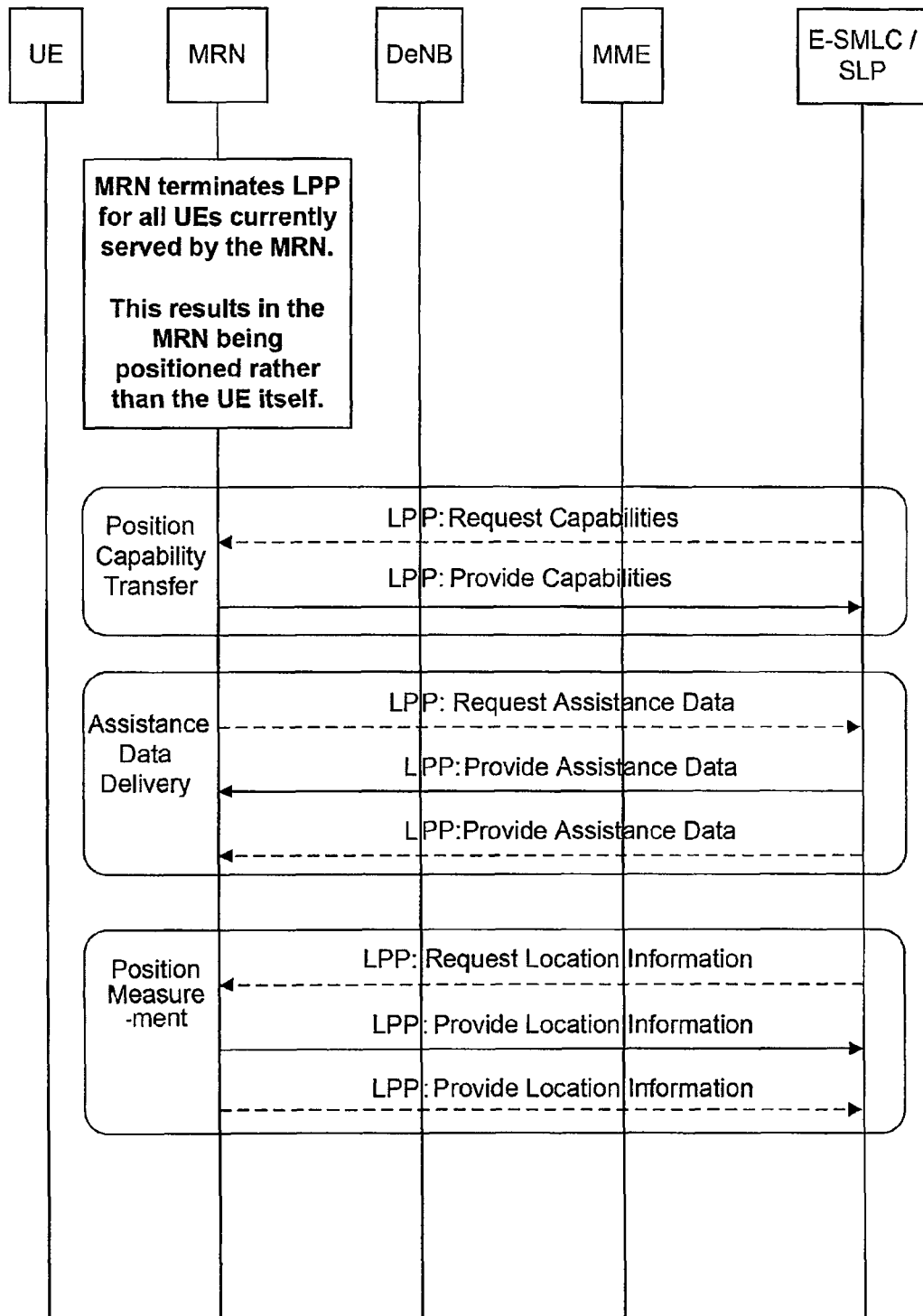
FIG. 15 shows another example timing diagram for MRN termination of positioning requests.

Moreover, as illustrated in FIG. 15, it will be appreciated that the above embodiments may be used to position a mobile relay node instead of (or before) positioning a target mobile telephone served in the relay node's mobile cell. For example, the MRN may intercept positioning requests intended to the user equipment it is serving and may position itself instead. In particular, the MRN may intercept LPP messages exchanged for the control plane method of positioning. Therefore, in this case the relay node terminates the LPP protocol for the user equipment it is serving and responds to the LCS server on their behalf. Positioning of the relay node may be performed according to the procedures described with reference to FIG. 10. This will advantageously allow positioning to be carried out with respect to user equipment currently located in mobile cells.

In the above embodiments, a single mobility management entity and a single location services server have been discussed. However, it will be appreciated that there might be a plurality of such entities in a deployed system. For example, different user equipment (or the base stations/relay nodes serving the user equipment) might be connected to different mobility management entities. Different location services clients might also communicate with different location services servers, each of which might be connected to the same or a different mobility management entity. In any case, the embodiments described above are applicable in such system configurations as well.

Furthermore, in the above embodiments, a single mobile relay node has been discussed, however, it will be appreciated that there might be a plurality of relay nodes provided in a deployed system. Moreover, LTE user equipment may be connected to more than one relay node and/or base station simultaneously and that user equipment may be handed over anytime between two neighbouring relay nodes or between a relay node and a base station. It will be appreciated that the above procedures are also applicable in such situations.

The sending of mobile cell information (i.e. any one of steps s901, s904, and s907) may be performed by the base station separately for each MRN upon the MRNs registering with the base station. Mobile cell information may be sent in a common message (e.g. a periodically or when a change occurs) listing each MRN currently operating under this donor base station. Furthermore, the base station may send updated mobile cell information upon a relay node changing its cell configuration (switching cells on/off, changing cell id, and the like) or upon the relay node de-registering with the donor base station.

The sending of mobile cell information (i.e. any one of steps s901, s904, and s907) may be performed by the base station sending messages separately to each MME to which it is attached for forwarding to each associated E-SMLC/SLP to which the MME is connected. For example, such separate messages may be required when radio access network sharing is used in MOCN (Multi-Operator Core Network) architecture, in the case when the core network is not shared.

Although in the discussion of FIGS. 9a and 9b the 'Mobile Cell Information' LPPa messages have been described, it will be appreciated that any other (new or existing) message might be used instead.

It will be appreciated that in the Mobile Cell Information Exchange procedure described with reference to FIG. 9b, rather than include all the information on every MRN currently registered with the DeNB, the Mobile Cell Information Update message may include information sufficient for identifying changes to the list of MRNs registered with the DeNB 5 and/or the associated mobile cells without providing information for every MRN. This could be achieved, for example, by providing the MRN UE ID and ECGI information for each newly registered MRN and/or at least the MRN UE ID for each removed MRN.

It will be further appreciated that, instead of using a dedicated information update message (a Mobile Cell Information Update message) to inform the E-SMLC/SLP of changes in the registered MRNs, the DeNB may send another information response message (a Mobile Cell Information Response message) with the mobile cell information for each currently registered MRN.

Although in the above embodiments, the relay node identifier (MRN UE ID) is included in the indication to the LCS Server that the relay node is 'mobile', it will be appreciated that other suitable identifiers can be used. For example, the relay node's IP or MAC address or any other unique identifier that has been allocated or assigned to the relay node, can be used instead. This identifier might be provided by the relay node or the donor base station or any other element of the communications network.

Whilst the signalling messages described herein that include the relay node identifier(s) and the mobile cell identifier(s) are advantageous in terms of simplicity, ease of implementation and minimising the number of messages required, the relay node identifier(s) and the mobile cell identifier(s) may be sent in any of a number of different ways. They may be sent, for example, in separate messages and/or included in separate information elements. Moreover, instead of modifying the described signalling messages and/or information elements, completely new messages and/or information elements may be generated which include the relay node identifier(s) and/or the mobile cell identifier(s).

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

Whilst in the above embodiments, a mobile relay node has been described, they are applicable to any type of relay nodes, i.e. non-mobile ones as well. For example, embodiments of the invention might be beneficial in case the configuration of the cell(s) of a relay node changes or when a relay node is connected to or disconnected from a donor base station.

In the embodiments described above, the UE, the relay station and the base station will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

Introduction

The purpose of this contribution is to discuss how LCS might work with cells which belong to a Mobile Relay Node (MRN).

Discussion

Figure 16:
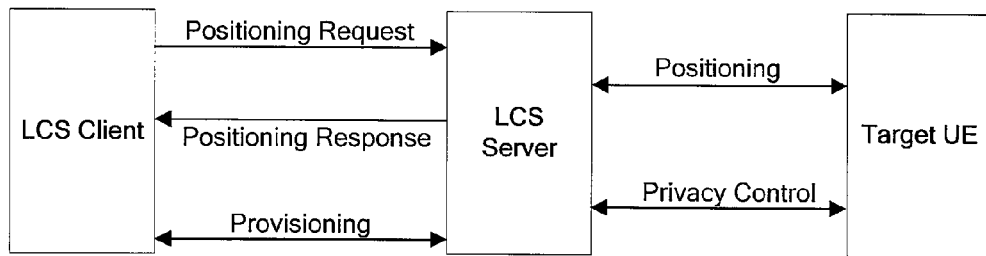
FIG. 16 shows a summary of an LCS logical reference model.

Background:

Location services (LCS) provide functionality to determine the geographic position and/or velocity of a UE based on measuring radio signals. LCS is based on the following logical reference model [2] (See FIG. 16):

The LCS Client is an entity which requests the location information of one or more target UEs. An LCS Client (e.g. an application) may be within the PLMN (e.g. within a UE) or external to the PLMN. The LCS Server uses a positioning function to obtain the location information requested by the LCS Client. The Target UE is the object to be positioned by the LCS Server.

Within LTE the Enhanced Serving Mobile Location Centre (E-SMLC) node provides LCS Server functionality, i.e. managing the overall co-ordination and calculations required for the location of a mobile.

Figure 17:
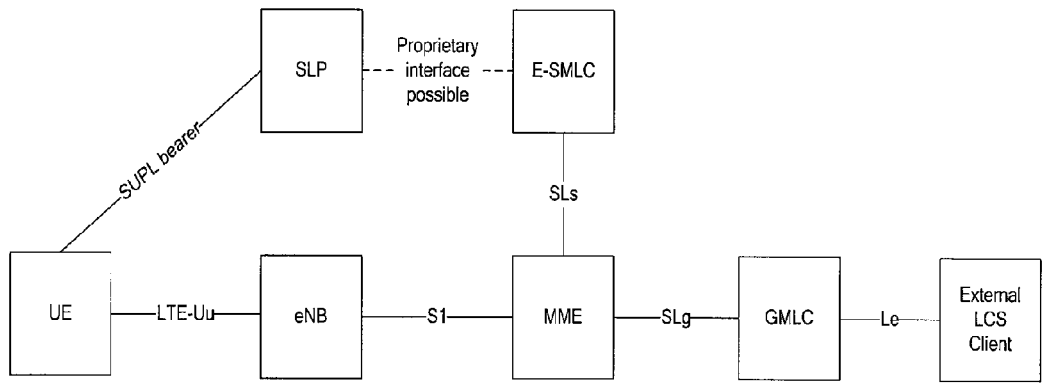
FIG. 17 shows an overview of an LTE UE positioning architecture.

FIG. 17 shows an overview of the architecture for UE positioning in LTE [1]:

Both control plane and user plane positioning are supported:

User plane positioning is supported using Secure User Plane Location (SUPL). The SLP (SUPL Location Platform) is the SUPL entity responsible for positioning co-ordination and calculations over the user plane. The SLP connects to the UE via a user plane data connection.

For control plane positioning the Enhanced Serving Mobile Location Centre (E-SMLC) is the positioning server node which manages the overall co-ordination and calculations required for the location of a mobile. The E-SMLC exchanges data with the eNB and UE using control plane signalling.

The UE positioning methods supported for E-UTRAN in Release 10 are:

Enhanced Cell ID (E-CID) based positioning method
   The position of a UE is estimated using knowledge about the geographical coordinates of the UEs serving eNB and cell.
Downlink Positioning using Observed Time Difference Of Arrival (OTDOA) method
   The position of a UE is estimated using measurements made by the UE of the UTRAN frame timing and knowledge about the geographical coordinates of the UEs serving eNB and cell.
Assisted Global Navigation Satellite System (A-GNSS) based positioning methods
   Used by UEs equipped with GNSS capability. Examples of GNSS include Global Positioning System (GPS) and Galileo. Providing network assistance on top of the GNSS, e.g. Assisted GPS (A-GPS), can reduce position calculation time from minutes to seconds.

The above positioning methods may be supported in UE-based, UE-assisted/E-SMLC-based, or eNB-assisted/E-SMLC based versions:

TABLE 1

Supported versions of UE positioning methods

| Method | UE-based | UE-assisted, E-SMLC-based | eNB-assisted, E-SMLC based | SUPL |
|---|---|---|---|---|
| A-GNSS | Yes | Yes | No | Yes (UE-based and UE-assisted |
| Downlink (OTDOA) | No | Yes | No | Yes (UE-assisted) |
| E-CID | No | Yes | Yes | Yes (UE-assisted) |

Hybrid positioning using multiple methods from the list of positioning methods above is also supported.

Figure 18:
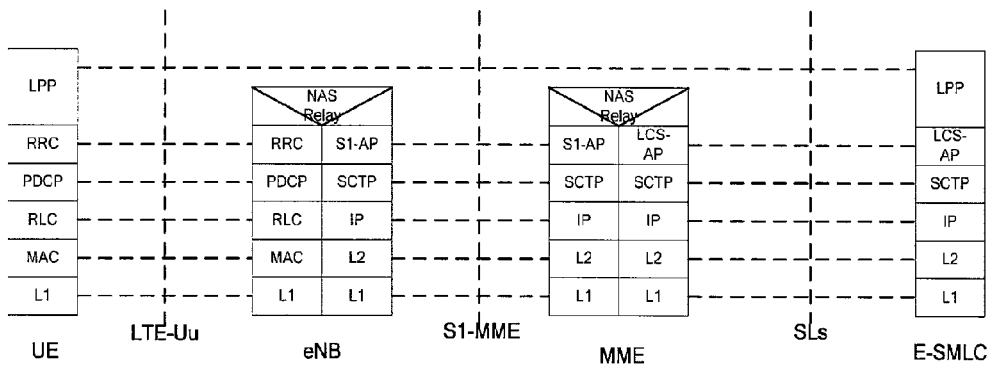
FIG. 18 shows an LPP protocol stack.
Figure 19:
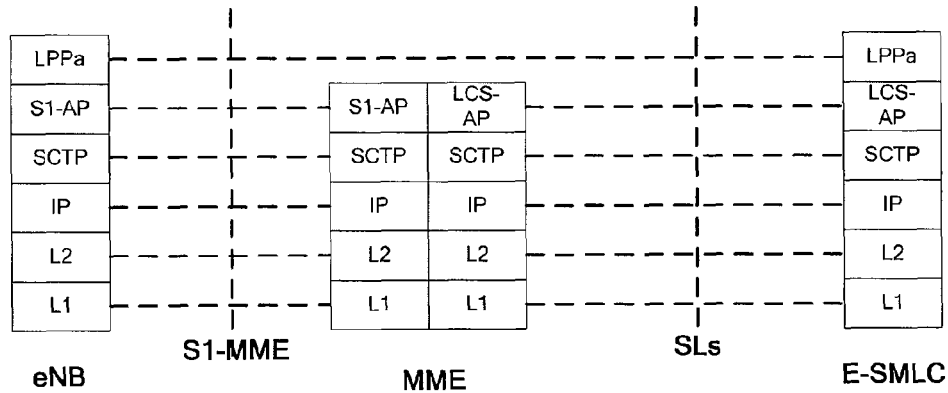
FIG. 19 shows an LPPa protocol stack.

Location protocols used are:

LPP (LTE Positioning Protocol) for use between a positioning server (E-SMLC/SLP) and target UE. This is either carried in NAS signalling or as user data. Either way it is transparent to the eNB. (See FIG. 18.)
LPPa (LTE Positioning Protocol Annex) for use between E-SMLC and eNB. This carried as a PDU within S1 signalling. (See FIG. 19.)

Over S1-MME, the LPPa PDUs are exchanged using the following S1-AP messages:

DOWNLINK UE ASSOCIATED LPPA TRANSPORT,
UPLINK UE ASSOCIATED LPPA TRANSPORT,
DOWNLINK NON UE ASSOCIATED LPPA TRANSPORT, and
UPLINK NON UE ASSOCIATED LPPA TRANSPORT The UE associated messages are used for transferring LPP messages regarding positioning of a specific UE. The Non-UE associated messages are used for transferring LPP messages regarding assistance data.

The basic message sequence is as follows, based on [1] (See FIG. 20):

Note: dotted lines in the figure represent messages which are optional within the procedure.

1. A UE positioning request is made by an LCS client (e.g. UE, eNB, MME, GMLC) and received by the positioning server (E-SMLC/SLP). The mechanism for this is not directly related to this document and is therefore not shown in detail.

2. E-SMLC/SLP selects positioning method(s) and initiates the necessary location procedures as applicable for the chosen method. There is no restriction on which of the following procedures may be used, or on the order in which they are performed. These procedures may be:

2a. UE procedures (using LPP)

2b. eNB procedures (using LPPa)

UE procedures:

There are three UE procedures: Position Capability Transfer, Assistance Data Delivery and Position Measurement.

Note: The 'Provide Location Information' message may either provide measurement information (E-SMLC based positioning) or location estimate (UE-based positioning) depending on the request from E-SMLC in 'Request Location Information'.

eNB procedures:

There are two eNB procedures: E-CID Measurement and OTDOA Information Exchange.

The E-CID Measurement procedure is UE specific (UE dedicated) and OTDOA Information Exchange is eNB specific (non UE-dedicated).

3. The E-SMLC then returns the location information back to the requesting LCS client Problem:

The current signalling procedures defined for supporting the above UE positioning methods may not be appropriate for Mobile RNs, which will be used primarily for use on high-speed trains, because:

Both E-CID and OTDOA methods require knowledge of the geographical coordinates of the E-UTRA cell being measured. In both cases the coordinates are assumed to be fixed.

The A-GNSS method requires UEs to have reception from satellites and therefore a clear and uninterrupted view of the sky is desirable. Reception for users inside a train carriage is therefore likely to be a problem.

Solutions:

The following solutions, and methods to achieve those solutions, are proposed in this document:

Solution 1: E-SMLC/SLP is aware of mobile cells and their movements

Method 1.1: Indicate which cells are mobile within the LPPa messages E-CID Measurement Initiation Response, E-CID Measurement Report and OTDOA Information Response Method 1.2: An indication that the cell is mobile may be delivered to the E-SMLC/SLP through O&M or other mechanisms external to the E-UTRAN Method 1.3: A new procedure, e.g. Mobile Cell Information Exchange, is introduced between the E-SMLC/SLP and eNB using the LPPa protocol Method 1.3.1: The procedure may be initiated by the DeNB Method 1.3.2: The procedure may be initiated by the E-SMLC Method 1.4: When the E-SMLC/SLP is asked to perform a positioning request for a UE, it discovers the UE is actually an MRN based on the information reported back by the UE Method 1.5: A positioning request for the MRN can be initiated by the E-SMLC/SLP itself, i.e. E-SMLC/SLP would act as both LCS client and LCS server, for the MRN as a UE Method 1.6: A positioning request for a MRN can be initiated autonomously by either the MRN itself or its DeNB Solution 2: MRN positions the UEs it is serving on their behalf Method 2.1: the MRN intercepts all positioning requests for UEs it is serving and positions itself instead. This means it will terminate the LPP protocol for UEs it is serving.

Solution 3: E-CID and OTDOA are not supported for Mobile Relay

Method 3.1: When the E-SMLC/SLP requests E-CID measurement initiation, the request is failed with a new specific failure cause (e.g. 'Cell is mobile') to inform the E-SMLC/SLP that this cell is mobile Method 3.2: an indication that the cell is mobile may be delivered to the E-SMLC/SLP through O&M or other mechanisms external to the E-UTRAN Method 3.3: A new procedure, e.g. Mobile Cell Information Exchange, is introduced between the E-SMLC/SLP and eNB using the LPPa protocol Method 3.3.1: The procedure may be initiated by the DeNB Method 3.3.2: the procedure may be initiated by the E-SMLC Detailed description of the potential solutions and methods are described below.

Solution 1: E-SMLC/SLP is Aware of Mobile Cells and their Movements

For this solution, the E-SMLC/SLP needs to be aware of the following:

(1) which cells are mobile, and (2) the current location of mobile cells

For (1), to determine which cells are mobile, the following options exist:

Method 1.1: Indicate which cells are mobile within the LPPa messages E-CID Measurement Initiation Response, E-CID Measurement Report and OTDOA Information Response.

Figure 20:
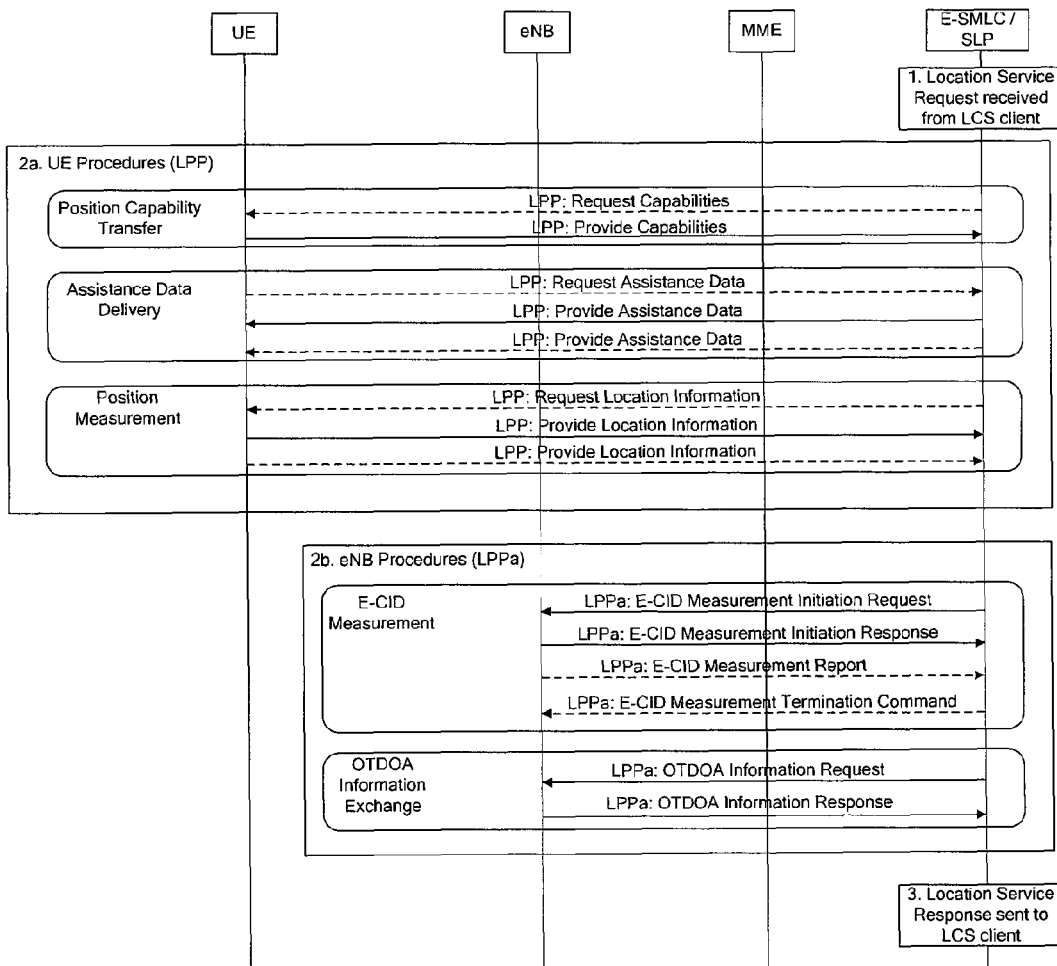
FIG. 20 shows an LCS basic message sequence.

When the E-SMLC/SLP requests the geographic coordinates of the cell via LPPa, as shown in step 2-b of FIG. 20: LCS Basic Message Sequence, a Release 10 eNB reports the geographic coordinates of a cell via LPPa with the 'E-UTRAN Access Point Position' IE. The LPPa messages within which the 'E-UTRAN Access Point Position' IE is included is the E-CID Measurement Initiation Response, E-CID Measurement Report and OTDOA Information Response messages.

Figure 21:
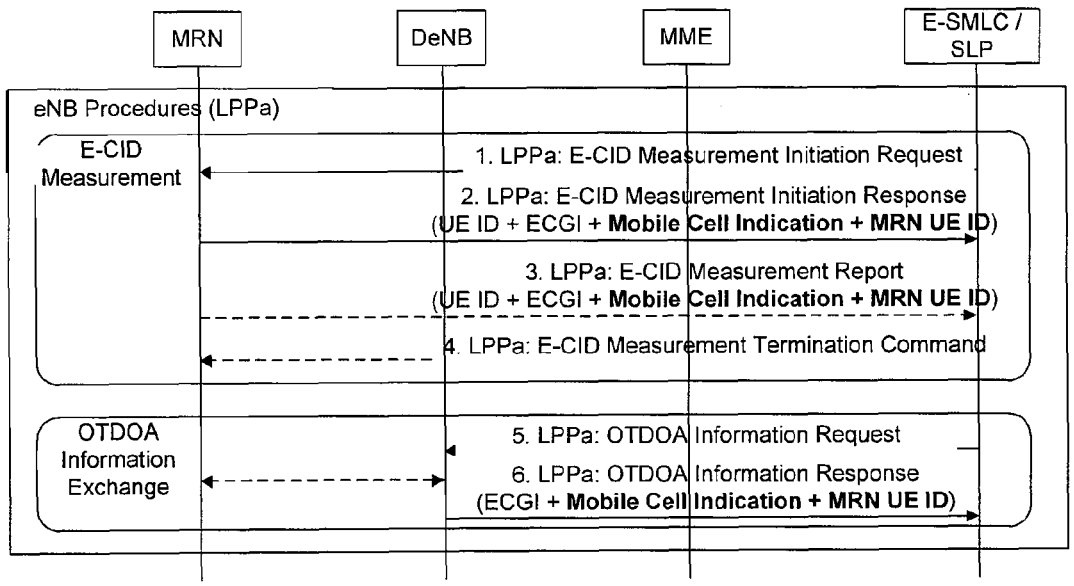
FIG. 21 shows a potential message sequence for eNB procedures.

A potential message sequence to achieve this method, representing the eNB procedures equivalent to step 2b in FIG. 20, is shown in FIG. 21:

1. E-SMLC/SLP initiates E-CID positioning for a specific UE using the LPPa: E-CID Measurement Initiation Request message. As this is a UE-dedicated procedure the LPPa PDUs are passed transparently by MME and DeNB between MME and MRN.

2. MRN responds with the LPPa: E-CID Measurement Initiation Response message. The geographic coordinates of the cell serving the UE are optionally provided in the 'E-UTRAN Access Point Position' IE. The proposed addition to LPPa: E-CID Measurement Initiation Response is to add IEs to indicate that the cell is mobile and also indicate the UE ID (e.g. IMSI) of the associated MRN. The MRN UE ID will enable E-SMLC/SLP to perform positioning of the MRN to determine the location of the mobile cell.

3. Depending upon the type of measurement requested in step 1, further LPPa: E-CID Measurement Report messages may be sent. This message may also optionally contain the 'E-UTRAN Access Point Position' IE and therefore the same additional IEs as mentioned in step 2 are proposed for LPPa: E-CID Measurement Report.

4. E-CID measurement termination is performed as existing.

5. E-SMLC/SLP can request information from an eNB using LPPa: OTDOA Information Request. As this is a non-UE dedicated procedure, as stated in TS36.300, the DeNB may trigger corresponding S1 non-UE-dedicated procedure(s) to the RN(s).

6. DeNB responds with the LPPa: OTDOA Information Response message. Details of each cell which broadcast PRS are included. The geographic coordinates of the cell serving the UE are provided in the mandatory 'E-UTRAN Access Point Position' IE. The proposed addition to LPPa: E-CID OTDOA Information Response is to add IEs to indicate somewhere within the message, e.g. within the 'OTDOA Cell Information' IE, that the cell is mobile and to also indicate the UE ID (e.g. IMSI) of the MRN. The MRN UE ID will enable E-SMLC/SLP to perform positioning of the MRN to determine the location of the mobile cell.

Method 1.2: An indication that the cell is mobile may be delivered to the E-SMLC/SLP through O&M or other mechanisms external to the E-UTRAN:

The E-SMLC/SLP can already determine the geographic coordinates of a cell via a similar existing mechanism in Release 10, see section 8.2.2 2 in TS36.305 [1].

The indication that the cell is mobile may be a direct parameter or indirect parameter, e.g. by using a PCI which belongs to a range which is explicitly reserved for mobile relay cells.

To enable the E-SMLC/SLP to subsequently position the MRN, the UE ID (e.g. IMSI) of the MRN will also need to be given to the E-SMLC/SLP via the same O&M/external mechanism.

Method 1.3: A new procedure, e.g. Mobile Cell Information Exchange, is introduced between the E-SMLC/SLP and eNB using the LPPa protocol.

Figure 22:
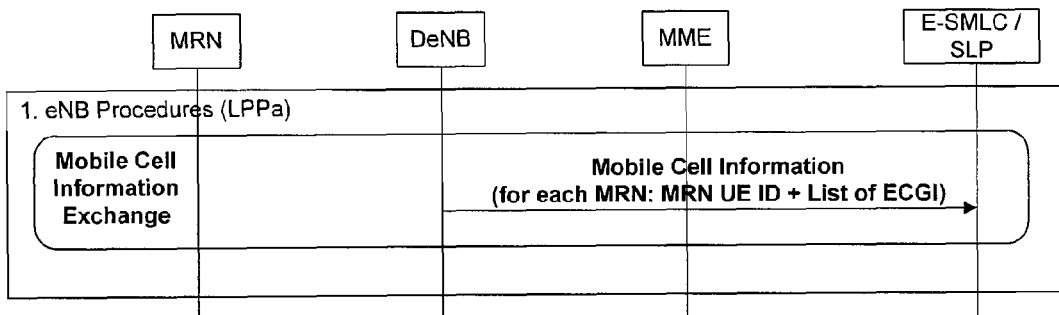
FIG. 22 shows a possible new mobile cell information exchange procedure.

Method 1.3.1: The procedure may be initiated by the DeNB (See FIG. 22):

Each time there is a change to the list of mobile cells served by MRNs attached to the DeNB (e.g. an MRN enters or leaves the service of the DeNB) the DeNB can send a new LPPa message, e.g. Mobile Cell Information, containing the new mobile cell information to each E-SMLC.

The new message would need to contain the UE ID (e.g. IMSI) of each MRN to enable the E-SMLC to perform UE positioning on the MRN itself, and the list of cells (e.g. E-CGIs) under the control of that MRN.

The new message could be sent from the DeNB to each attached MME, which in turn forwarded the message to each E-SMLC/SLP to which it is connected. An example of when such multiple messages may be required is when RAN sharing is used using the MOCN (Multi-Operator Core Network) architecture, i.e. when the EPC is not shared.

The LPPa message could be sent as a container with the existing messages UPLINK NON UE ASSOCIATED LPPA TRANSPORT over S1-MME and LCS-AP Connectionless Information message over SLs.

The above method could be made generic, i.e. not mobile specific, where the DeNB reports any change in the served cell list to the E-SMLC/SLP.

Figure 23:
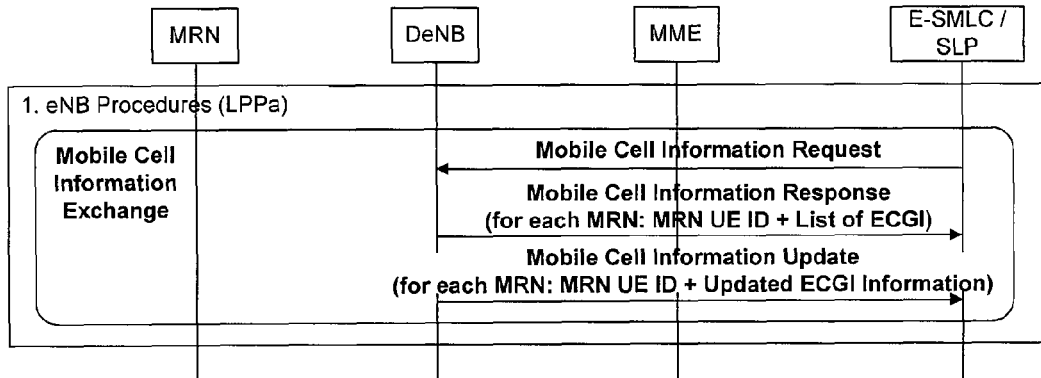
FIG. 23 shows a possible new mobile cell information exchange procedure.

Method 1.3.2: The procedure may be initiated by the E-SMLC (See FIG. 23):

Each E-SMLC may ask each eNB to report information about any mobile cells under its control a new LPPa message, e.g. Mobile Cell Information Request.

The new response message, e.g. Mobile Cell Information Response, would need to contain the UE ID (e.g. IMSI) of each MRN to enable the E-SMLC to perform UE positioning on the MRN itself, and the list of cells (e.g. E-CGIs) under the control of that MRN.

Subsequently, each time a MRN enters or leaves its control then the DeNB can send the updated mobile cell information to the E-SMLC/SLP. This could re-use the initial response message, e.g. Mobile Cell Information Response, or have a specific message for this purpose, e.g. Mobile Cell Information Update.

These new LPPa messages could be sent as containers with the existing messages UPLINK NON UE ASSOCIATED LPPA TRANSPORT and DOWNLINK NON UE ASSOCIATED LPPA TRANSPORT over S1-MME and LCS-AP Connectionless Information message over SLs.

As for method 1.3.1, the above method could be made generic, i.e. not mobile specific, where the DeNB reports any change in the served cell list to the E-SMLC/SLP.

Figure 24:
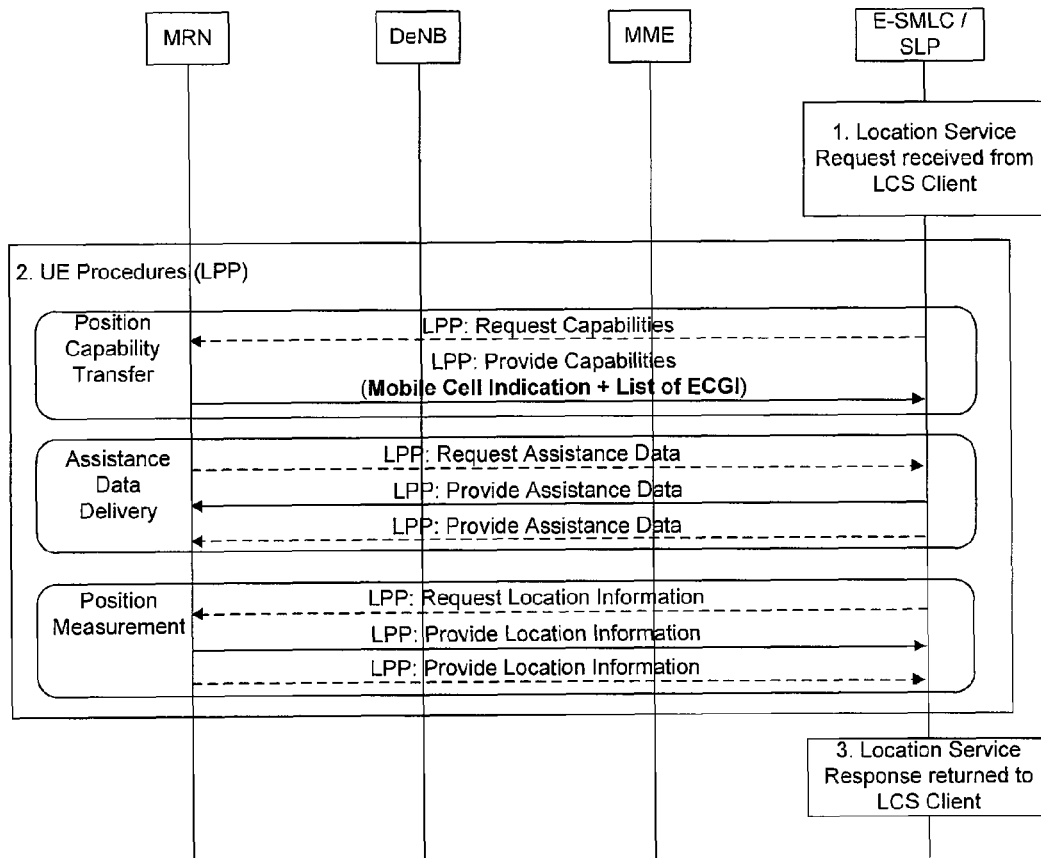
FIG. 24 shows a possible MRN positioning message sequence.

Method 1.4: When the E-SMLC/SLP is asked to perform a positioning request for a UE, it discovers the UE is actually an MRN based on the information reported back by the UE Based on a request by an LCS client to position this UE, the E-SMLC/SLP would initiate normal UE positioning during which the UE would inform the E-SMLC/SLP it is acting as a MRN:

The sequence shown in FIG. 24 is identical to the sequence to position a normal UE, except:

The MRN can provide the E-SMLC/SLP with additional information, e.g.

Indicate it is an MRN rather than a normal UE
Include some form of 'MRN indication' in an LPP message, e.g. 'ProvideCapabilities'

The cell(s) of the MRN
The cell(s) of the MRN, i.e. including identifiers of the cells, e.g. E-CGI, in an LPP message, e.g. 'ProvideCapabilities'

For (2), i.e. how the E-SMLC/SLP will know the current location of mobile cells, the following options exist:

Method 1.5: A positioning request for the MRN can be initiated by the E-SMLC/SLP itself, i.e. E-SMLC/SLP would act as both LCS client and LCS server, for the MRN as a UE.

Normal UE positioning can be used to locate the MRN (in its role as a UE itself), i.e. the OTDOA, E-CID and A-GNSS methods can all be used to determine the position of the MRN.

Figure 25:
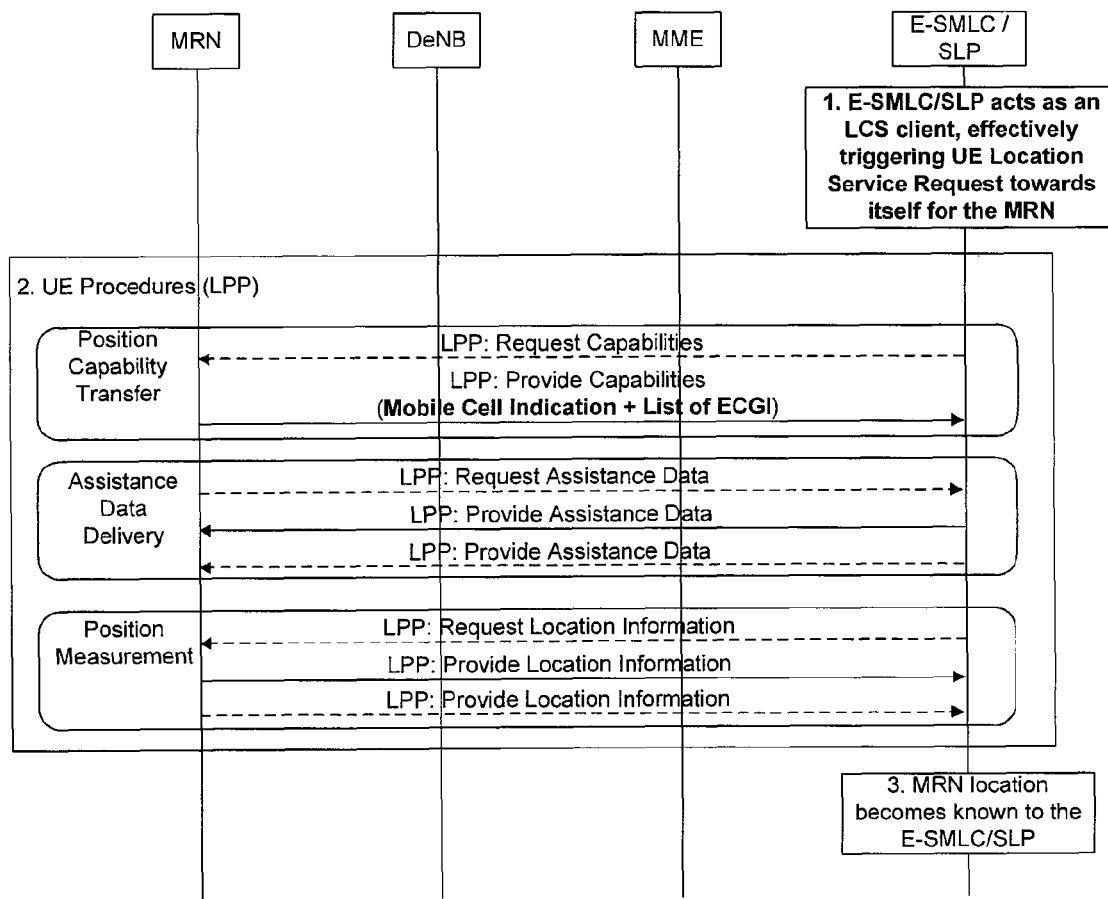
FIG. 25 shows a possible MRN positioning message sequence.

The sequence shown in FIG. 25 is identical to the sequence to position a normal UE, except:
   The E-SMLC/SLP is initiating the positioning request, and
   The MRN can provide the E-SMLC/SLP with additional information as mentioned in method 1.4, e.g. list of cells it controls. This may useful, e.g. in the case where the MRN controls multiple cells but the E-SMLC/SLP is only aware of one of them.

Figure 26:
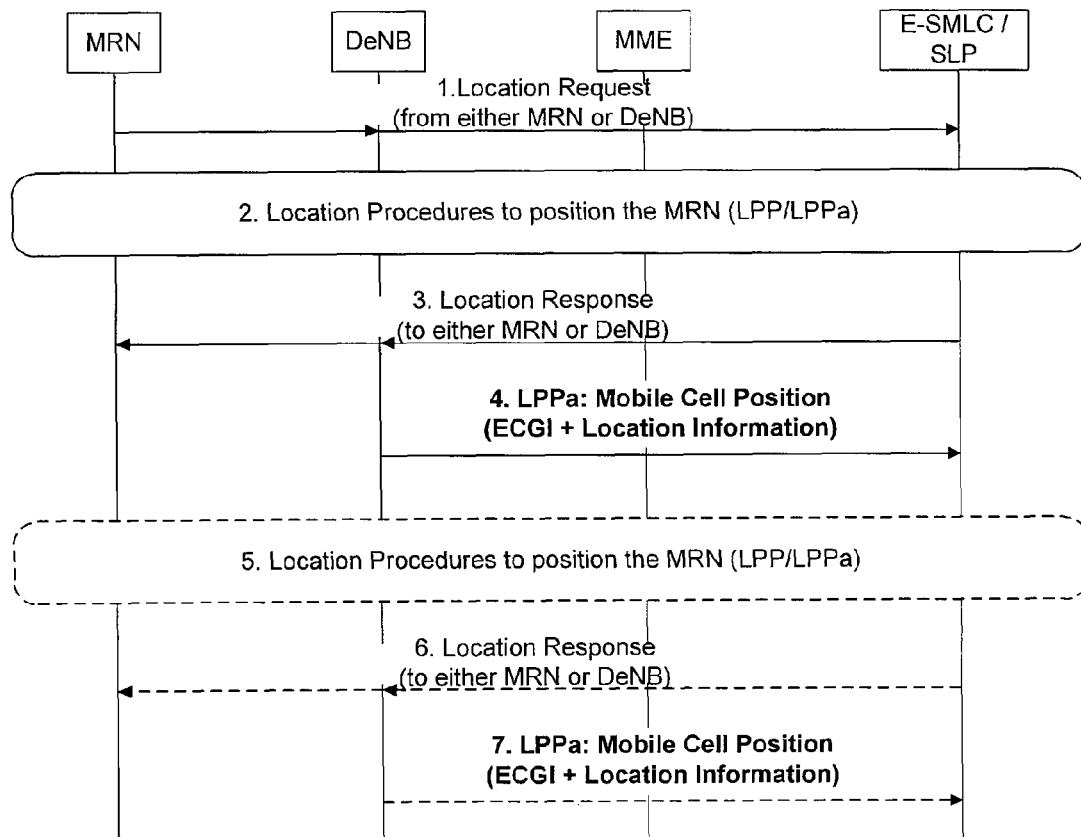
FIG. 26 shows a possible MRN positioning message sequence.

Method 1.6: A positioning request for a MRN can be initiated autonomously by either the MRN itself or its DeNB.
   As above, normal UE positioning can be used to locate the MRN (in its role as a UE itself), i.e. the OTDOA, E-CID and A-GNSS methods can all be used to determine the position of the MRN.
   MRN could initiate positioning as soon as it performs RN start-up. DeNB could initiate positioning for the MRN as soon as the MRN connected to its cell.
   A new procedure would be required to constantly update each E-SMLC/SLP with the current mobile cell location:
   Steps 1, 2 and 3 in FIG. 26 are the same as shown in FIG. 25 with the exception that the location request has been initiated by the MRN or DeNB.
   In Step 4 the new location is informed via the MME to each E-SMLC/SLP to which it is attached. This information may include information such as current geographic coordinates with timestamp, speed and direction of travel and additional pre-defined route information if known to the MRN or DeNB.
   Steps 5, 6, & 7 are a repeat of steps 2, 3, & 4 for periodic location reporting in order to keep the E-SMLC/SLP up to date on the MRN location.
   Note that in the case that only a single E-SMLC/SLP is connected to each MME, steps 4 & 7 may not be required providing (a) E-SMLC/SLP based location calculation is performed and (b) the E-SMLC/SLP retains the current location information it has been asked to calculate for a MRN (this may be possible as it will know the relevant UE ID from (1) above).

When the E-SMLC/SLP has information about the mobile cell, it can choose the most appropriate positioning method for a UE being served by that mobile cell. For example, for a UE being served by a mobile cell, the E-SMLC/SLP may decide that the position of the mobile cell is enough to locate the UE and therefore, for the UE, may only use E-CID positioning with only reporting of a change of cell id configured.

Figure 27:
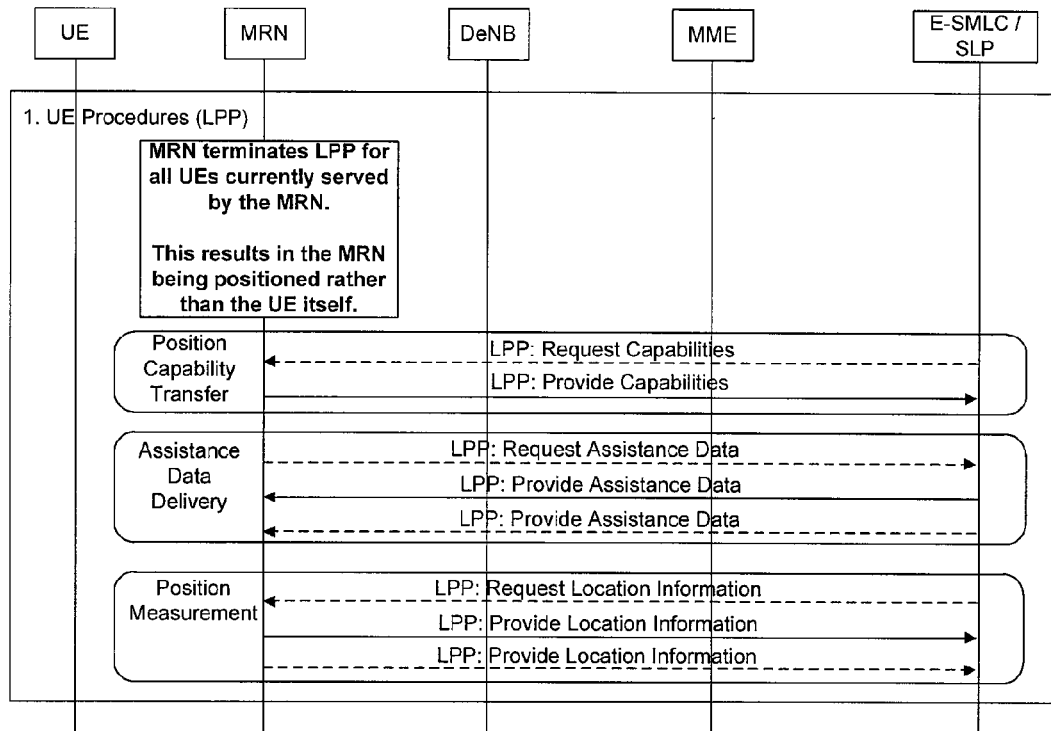
FIG. 27 shows a possible MRN positioning message sequence.

Solution 2: MRN Positions the UEs it is Serving on their Behalf
   Method 2.1: the MRN intercepts all positioning requests for UEs it is serving and positions itself instead. (See FIG. 27.) This means it will terminate the LPP protocol for UEs it is serving.

Solution 3: E-CID and OTDOA are not Supported for Mobile Relay
   For this solution, E-CID and OTDOA methods of positioning would not be supported for mobile relay.
   This avoids the complexity of the E-SMLC/SLP requiring knowledge of the movements of mobile cells. However, this option would mean that only A-GNSS is available for UE positioning. Poor satellite reception may make this an issue for UEs inside a train carriage.

Figure 28:
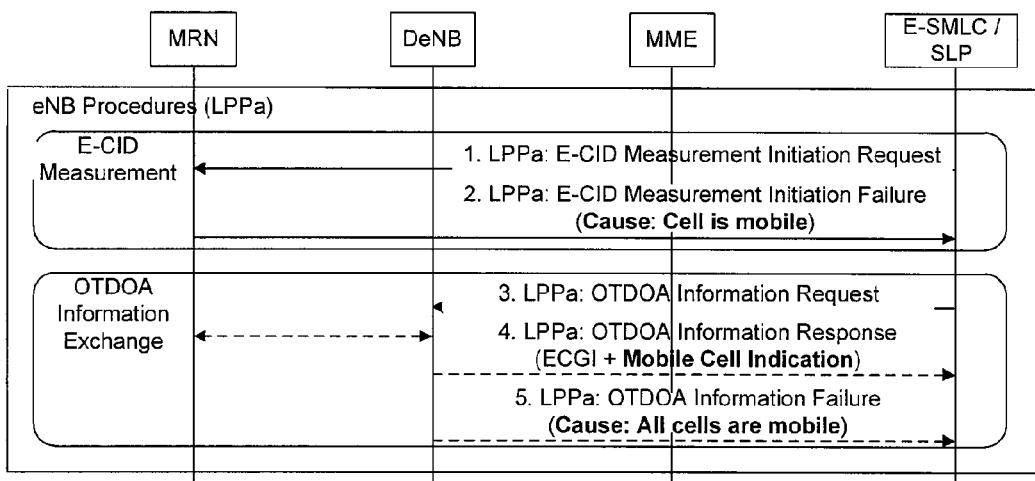
FIG. 28 shows a potential message sequence for eNB procedures.
Figure 29:
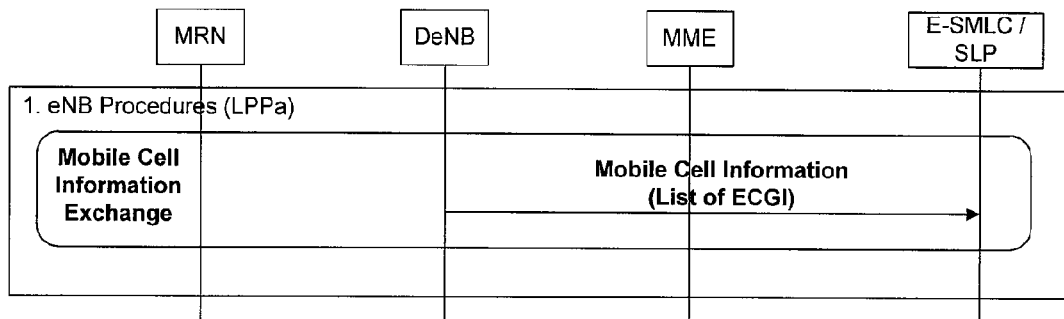
FIG. 29 shows a possible new mobile cell information exchange procedure.
Figure 30:
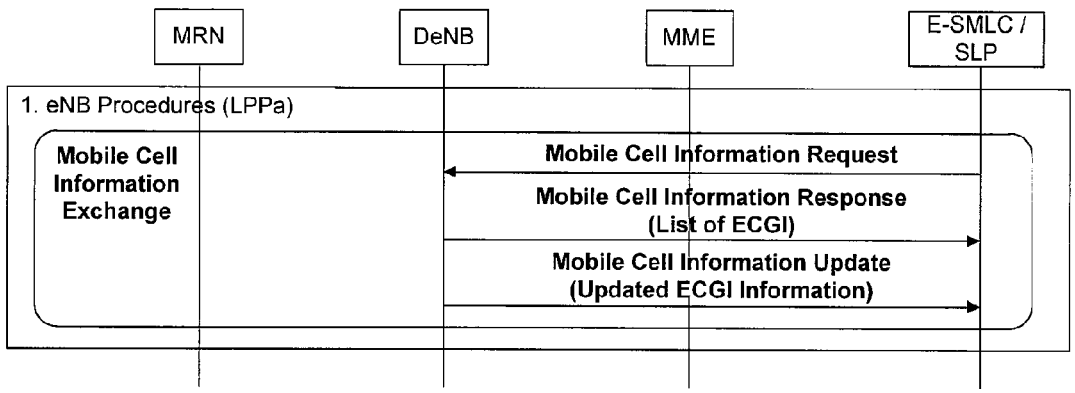
FIG. 30 shows a possible new mobile cell information exchange procedure.

Unless the E-SMLC/SLP knows which cells are mobile it may still initiate LPP or LPPa procedures for these methods. For this reason the E-SMLC/SLP needs to know which cells are mobile. The same options as similar to those for solution 1 earlier in this document:
   Method 3.1: When the E-SMLC/SLP requests E-CID measurement initiation, the request is failed by sending LPPa: E-CID Measurement Initiation Failure with a new specific failure cause (e.g. 'Cell is mobile') to inform the E-SMLC/SLP that this cell is mobile.
   Similarly, when the E-SMLC/SLP requests OTDOA information, the response message would inform the E-SMLC/SLP of the mobile cells. The response message may be either:
      LPPa: OTDOA Information Response, which would contain a new IE, e.g. 'mobile cell indication', for mobile cells. If such an IE were set then the other requested OTDOA related IEs would not be present.
      LPPa: OTDOA Information Failure, e.g. when all cells to report are mobile. In this case a new cause value, e.g. 'All cells are mobile' could be used. (See FIG. 28.)
   Method 3.2: an indication that the cell is mobile may be delivered to the E-SMLC/SLP through O&M or other mechanisms external to the E-UTRAN:
      The E-SMLC/SLP can already determine the geographic coordinates of a cell via a similar existing mechanism in Release 10.
      The indication that the cell is mobile may be a direct parameter or indirect parameter, e.g. by using a PCI which belongs to a range which is explicitly reserved for mobile relay cells.
   Method 3.3: A new procedure, e.g. Mobile Cell Information Exchange, is introduced between the E-SMLC/SLP and eNB using the LPPa protocol.
      Method 3.3.1: The procedure may be initiated by the DeNB (See FIG. 29):
         Each time there is a change to the list of mobile cells served by MRNs attached to the DeNB (e.g. an MRN enters or leaves the service of the DeNB) the DeNB can send a new LPPa message, e.g. Mobile Cell Information, containing the list of mobile cells (e.g. list of E-CGI) to each E-SMLC.
         The new message could be sent from the DeNB to each attached MME, which in turn forwarded the message to each E-SMLC/SLP to which it is connected.
         The LPPa message could be sent as a container with the existing messages UPLINK NON UE ASSOCIATED LPPA TRANSPORT over S1-MME and LCS-AP Connectionless Information message over SLs.
      Method 3.3.2: The procedure may be initiated by the E-SMLC (See FIG. 30):
         Each E-SMLC may ask each eNB to report information about any mobile cells under its control a new LPPa message, e.g. Mobile Cell Information Request.
         Subsequently, each time a MRN enters or leaves its control then the DeNB can send the updated mobile cell information to the E-SMLC/SLP. This could re-use the initial response message, e.g.

Mobile Cell Information Response, or have a specific message for this purpose, e.g. Mobile Cell Information Update.

These new LPPa messages could be sent as containers with the existing messages UPLINK NON UE ASSOCIATED LPPA TRANSPORT and DOWNLINK NON UE ASSOCIATED LPPA TRANSPORT over S1-MME and LCS-AP Connectionless Information message over SLs.

REFERENCES

[1] 3GPP TS 36.305 (V10.3.0); Stage 2 functional specification of User Equipment (UE) positioning in E-UTRAN
[2] 3GPP TS 22.071 (V10.0.0); Location Services (LCS); Service description; Stage 1
[3] 3GPP TS 36.300 (V10.8.0); Evolved Universal Terrestrial Radio Access (E-UTRA) and Evolved Universal Terrestrial Radio Access Network (E-UTRAN); Overall description; Stage 2
[4] 3GPP TS 36.355 (V10.5.0); LTE Positioning Protocol
[5] 3GPP TS 36.455 (V10.3.0), LTE Positioning Protocol A (LPPa)
[6] 3GPP TS 36.413 (V10.6.0), S1 Application Protocol (S1AP)

This application is based upon and claims the benefit of priority from United Kingdom patent application No. 1211998.8 filed on Jul. 5, 2012, the disclosure of which is incorporated herein in its entirety by reference.

The invention claimed is:

1. A base station comprising:
a memory having stored thereon instructions; and
a controller configured to process the instructions to:
control a connection between the base station and a mobile relay node, installed in a vehicle, for providing a user equipment with access to a communication system via a cell operated by the mobile relay node, and
obtain an indication of whether or not the cell is a mobile cell from the mobile relay node, and, when the cell is a mobile cell, provide, to a location services server comprising at least one of an Enhanced Serving Mobile Location Center (E-SMLC) and a Secure User Plane Location (SUPL) Location Platform (SLP), information indicating that the cell is a mobile cell, as a part of a location positioning protocol procedure with the location services server.

2. The base station according to claim 1 wherein the controller is further configured to process the instructions to provide updated information indicating that the cell is no longer associated with the base station, in response to de-associating from the mobile relay node.

3. The base station according to claim 1 wherein the controller is further configured to process the instructions to provide information identifying one of the mobile relay node and the cell, and wherein the controller is further configured to process the instructions to compare the information identifying the one of the mobile relay node and the cell with information identifying a list of mobile cells, thereby determining whether or not the cell is a mobile cell.

4. The base station according to claim 1 wherein the controller is further configured to process the instructions to provide the information indicating that the cell a mobile cell to the location services server via a mobility management entity.

5. A mobile relay node, installed in a vehicle, the mobile relay node comprising:
a memory having stored thereon instructions; and
a controller configured to process the instructions to:
control communications between the mobile relay node and a base station and between the mobile relay node and a user equipment,
perform registration between the mobile relay node and the base station,
keep track of the user equipment via at least one cell operated by the mobile relay node, and
provide, to a location services server that comprises at least one of an Enhanced Serving Mobile Location Center (E-SMLC) and a Secure User Plane Location (SUPL) Location Platform (SLP), information indicating that the at least one cell is a mobile cell, as part of a location positioning protocol procedure,
wherein the controller is further configured to process the instructions to provide the information, indicating that the at least one cell is a mobile cell, in response to the mobile relay node receiving a request, via the base station, to provide information relating to the location of the user equipment.

6. The mobile relay node according to claim 5 wherein the information indicating that the cell is a mobile cell comprises one of:
an identifier for identifying the mobile relay node as a target communication device, and
a cell identifier identifying the cell, and
a 'Mobile Cell Indication' information element.

7. The mobile relay node according to claim 5 wherein the controller is further configured to process the instructions to perform one of:
providing information identifying the user equipment;
providing the information indicating that the at least one cell is a mobile cell in response to the base station registration module performing registration with the base station; and
providing the information indicating that the at least one cell is a mobile cell in response to a change in a configuration of the cell to become a mobile cell.

8. The mobile relay node according to claim 5, wherein the controller is further configured to process the instructions to provide, to the location services server, information indicating a current location of the mobile relay node.

9. The mobile relay node according to claim 5 wherein the controller is further configured to process the instructions to provide, to the location services server, the information indicating that the cell is a mobile cell by transmitting a message to the location services server,
wherein the message comprises one of:
an LTE (Long Term Evolution) Positioning Protocol 'LPP' message, an LTE Positioning Protocol Annex 'LPPa' message, a Radio Resource Control 'FIRC' protocol message, an 'E-CID Measurement Initiation Response', an OTDOA Information Response', a 'Provide Capabilities' message, a 'Mobile Cell Information' message, a 'Mobile Cell Information Response', an 'E-CID Measurement Initiation Failure', an OTDOA Information Failure', and a 'Mobile Cell Position' message.

10. A location services server comprising:
a network interface which receives, from a location services client, a request for positioning a target user device, the target user device being served by a mobile relay node installed in a vehicle;
a memory having stored thereon instructions; and a controller configured to process the instructions to:
identify a cell in which the target user device is located,
respond to the request for positioning the target user device by initiating a location positioning protocol procedure,
receive a cell identifier when the mobile relay node associates with the locations services server in response to a request sent by the location services server to the mobile relay node,
determine, based on the received cell identifier, whether or not the identified cell is a mobile cell as part of the location positioning protocol procedure, and
upon determination that the identified cell is a mobile cell, initiate a procedure to determine a position of the mobile relay node that operates the cell in which the target user device is located.

11. The location services server according to claim 10, further comprising a transceiver circuit configured to receive a cell identifier, and
wherein the controller is further configured to process the instructions to determine whether or not the cell is a mobile cell based on the received cell identifier,
wherein the cell identifier is an E-UTRAN Cell Global Identifier 'ECGI'.

12. The location services server according to claim 10 wherein the controller is further configured to process the instructions to respond to the request for positioning the target user device by performing at least one of:
i) sending, to the location services client, a failure indication when it is determined that the identified cell is a mobile cell;
ii) determining a current location of one of the mobile relay node and the identified cell when it is determined that the identified cell is a mobile cell and sending the current location of the one of the mobile relay node and the identified cell to the location services client; and
iii) determining a current location of one of the mobile relay node and the identified cell when it is determined that the identified cell is a mobile cell, determining a location of the target user device based on the current location of the one of the mobile relay node and the identified cell and a position of the target user device relative to the current location of the one of the mobile relay node and the identified cell, when it is determined that the identified cell is a mobile cell.

13. The location services server according to claim 12 wherein the position of said target user device relative to the current location of the one of the mobile relay node and the identified cell is determined based on information received from said mobile relay node.

14. The location services server according to claim 11 wherein the controller is further configured to process the instructions to determine a location of the target user device based on a satellite positioning scheme when the identified cell is determined to be a mobile cell.

15. The location services server according to claim 10 wherein the controller is further configured to process the instructions to determine whether or not the identified cell is a mobile cell by comparing information identifying the identified cell with information identifying a list of mobile cells.

16. The location services server according to claim 10, further comprising a transceiver circuit which receives a message comprising information indicating that the identified cell is a mobile cell.

17. A communication system comprising the base station of claim 1.

18. A method of a base station operating in a communication system, the method comprising:
associating with a mobile relay node, installed in a vehicle, that provides a user device with access to the communication system via a cell operated by the relay node;
obtaining, from the mobile relay node, an indication of whether or not the cell operated by the mobile relay node is a mobile cell; and
when the cell operated by the mobile relay node is configured as a mobile cell, providing, to a location services server that comprises at least one of an Enhanced Serving Mobile Location Center (E-SMLC) and a Secure User Plane Location (SUPL) Location Platform (SLP), information indicating that the cell operated by the mobile relay node is a mobile cell, as part of a location positioning protocol procedure with the location services server.

19. A method of a mobile relay node, installed in a vehicle and operating in a communication system, the method comprising:
associating with a base station; and
providing, to a location services server that comprises at least one of an Enhanced Serving Mobile Location Center (E-SMLC) and a Secure User Plane Location (SUPL) Location Platform (SLP), information indicating that at least one cell operated by the mobile relay node is a mobile cell, as part of a location positioning protocol procedure,
wherein the providing comprises providing the information indicating that the at least one cell is a mobile cell in response to the mobile relay node receiving a request, via the base station, to provide information relating to the location of a user equipment.

20. A method of a location services server operating in a communication system, the method comprising:
receiving, from a client, a request for positioning a target user device served by a mobile relay node installed in a vehicle;
identifying a cell in which the target user device is located;
responding to the request for positioning the target user device, by initiating a location positioning protocol procedure;
receiving a cell identifier when the mobile relay node associates with the location services server in response to a request sent by the location services server to the mobile relay node;
determining, based on the received cell identifier, whether or not the identified cell is a mobile cell, as part of the location positioning protocol procedure; and
upon determination that the identified cell is a mobile cell, initiating a procedure to determine a position of a mobile relay node that operates the cell in which the target user device is located.

21. A non-transitory computer-readable program product having stored thereon computer implementable instructions for causing a programmable computer device to operate as the base station of claim 1.

22. A non-transitory computer-readable program product having stored thereon computer implementable instructions for causing a programmable computer device to operate as the mobile relay node of claim 5.

* * * * *